US012804089B2

(12) United States Patent
Lee et al.

(10) Patent No.: US 12,804,089 B2
(45) Date of Patent: Nov. 17, 2026

(54) CIRCUIT BOARD-EQUIPPED APPARATUS HAVING BLOCKING MEMBER FOR PREVENTING FOREIGN OBJECT ENTRY

(71) Applicant: FUJIFILM Business Innovation Corp., Tokyo (JP)

(72) Inventors: Bokryong Lee, Kanagawa (JP); Takayuki Totsuka, Kanagawa (JP); Shuntaro Tanaka, Kanagawa (JP); Naoki Sambe, Kanagawa (JP); Tomoya Ito, Kanagawa (JP); Kento Kumagami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 256 days.

(21) Appl. No.: 18/668,280

(22) Filed: May 20, 2024

(65) Prior Publication Data

US 2025/0175562 A1 May 29, 2025

(30) Foreign Application Priority Data

Nov. 29, 2023 (JP) ................................ 2023-201615

(51) Int. Cl.
*H04N 1/00* (2006.01)

(52) U.S. Cl.
CPC ..... *H04N 1/00519* (2013.01); *H04N 1/00615* (2013.01)

(58) Field of Classification Search
USPC .......................................................... 358/400
See application file for complete search history.

(56) References Cited

U.S. PATENT DOCUMENTS

| | | | |
|---|---|---|---|
| 9,712,701 B2 | 7/2017 | Yamamoto et al. | |
| 2011/0317377 A1 | 12/2011 | Nishi | |
| 2016/0044193 A1* | 2/2016 | Wells, II ............ | H04N 1/00588 358/474 |
| 2016/0273852 A1* | 9/2016 | Hayashi .................. | F28F 23/00 |
| 2018/0103542 A1* | 4/2018 | Shinotsuka ........ | G03G 21/1652 |

FOREIGN PATENT DOCUMENTS

| | | |
|---|---|---|
| JP | 2016159986 | 9/2016 |
| JP | 2017044986 | 3/2017 |
| JP | 2018125609 | 8/2018 |

OTHER PUBLICATIONS

"Search Report of Europe Counterpart Application", issued on Oct. 11, 2024, p. 1-p. 9.

* cited by examiner

*Primary Examiner* — Jacky X Zheng
(74) *Attorney, Agent, or Firm* — JCIPRNET

(57) ABSTRACT

A circuit board-equipped apparatus includes a circuit board; an attachment plate to which the circuit board is attached; a structure that is disposed above the circuit board and that requires work; and a blocking member that is provided in at least a part of a range from the structure to the circuit board and that blocks at least a part of a route along which an article falling from above due to the work moves toward a gap between the circuit board and the attachment plate.

20 Claims, 13 Drawing Sheets

CIRCUIT BOARD-EQUIPPED APPARATUS HAVING BLOCKING MEMBER FOR PREVENTING FOREIGN OBJECT ENTRY

CROSS-REFERENCE TO RELATED APPLICATIONS

This application is based on and claims priority under 35 USC 119 from Japanese Patent Application No. 2023-201615 filed Nov. 29, 2023.

BACKGROUND

(i) Technical Field

The present invention relates to a circuit board-equipped apparatus.

(ii) Related Art

JP2018-125609A describes an image reading apparatus.

JP2018-125609A describes that the image reading apparatus includes a sheet transport unit, a reading unit that reads an image of the sheet, a driving unit that transmits power to the transport unit, a first cover, and a second cover. The first cover is a cover that is in a state of covering a part of a transport path of the sheet in a case of being displaced to a closed position and is in a state of exposing a part of the transport path to the outside in a case of being displaced to an open position. The second cover is a cover that is provided at a position adjacent to the first cover in the closed position and covers the driving unit.

In addition, JP2018-125609A also describes that the image reading apparatus has a structure in which the second cover has a partition wall disposed at a position that separates the driving unit and the transport path, and a first gap is provided between the partition wall and another member that is disposed below the partition wall such that spaces on both sides of the partition wall communicate with each other, or the first gap may be generated.

Further, JP2018-125609A also describes that the image reading apparatus has a structure in which a second gap is provided between the first cover in the closed position and the partition wall, or the second gap may be generated, and a reception unit that receives a foreign matter falling downward through the second gap is provided at a position directly below the second gap and at a position above the first gap.

JP2016-159986A describes a sheet transport apparatus.

JP2016-159986A describes that the sheet transport apparatus includes a loading unit of a sheet, feeding means for feeding the sheet loaded in the loading unit, a transport guide provided downstream of the feeding means, a sensor, a control substrate, a protective member, and a sensor unit. The sensor is a sensor that detects the sheet transported on the transport guide through an opening portion provided in the transport guide. The control substrate is a substrate on which an element of the sensor is provided. The protective member is a member provided to cover the element. The sensor unit is a unit disposed below the transport guide.

In addition, JP2016-159986A also describes that, in the sheet transport apparatus, the protective member includes an abutting unit that abuts on an upper surface of the control substrate and a claw-like engaging unit that engages with a lower surface of the control substrate.

SUMMARY

Aspects of non-limiting embodiments of the present disclosure relate to a circuit board-equipped apparatus that prevent an article falling from above due to work from entering a gap between a circuit board and an attachment plate in a circuit board-equipped apparatus including a circuit board, an attachment plate to which the circuit board is attached, and a structure that is disposed above the circuit board and requires work.

Aspects of non-limiting embodiments of the present disclosure relate to a circuit board-equipped apparatus that prevent the article falling from above due to the work from entering the gap between the circuit board and the attachment plate, as compared with a case where a blocking member that blocks at least a part of a route along which the article moves toward the gap is not provided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a circuit board-equipped apparatus including: a circuit board; an attachment plate to which the circuit board is attached; a structure that is disposed above the circuit board and that requires work; and a blocking member that is provided in at least a part of a range from the structure to the circuit board and that blocks at least a part of a route along which an article falling from above due to the work moves toward a gap between the circuit board and the attachment plate.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments for implementing the present invention will be described.

Exemplary Embodiment 1

Figure 1A:
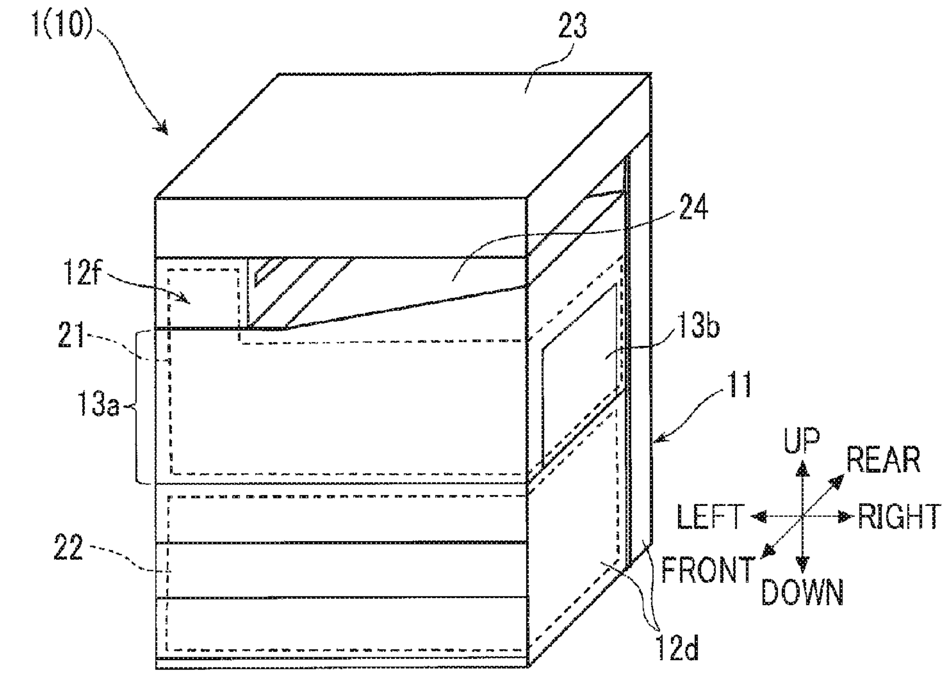
FIG. 1A is a schematic perspective view of an image forming apparatus which is an example of a circuit board-equipped apparatus according to Exemplary Embodiment 1 as viewed from an obliquely front side.
Figure 1B:
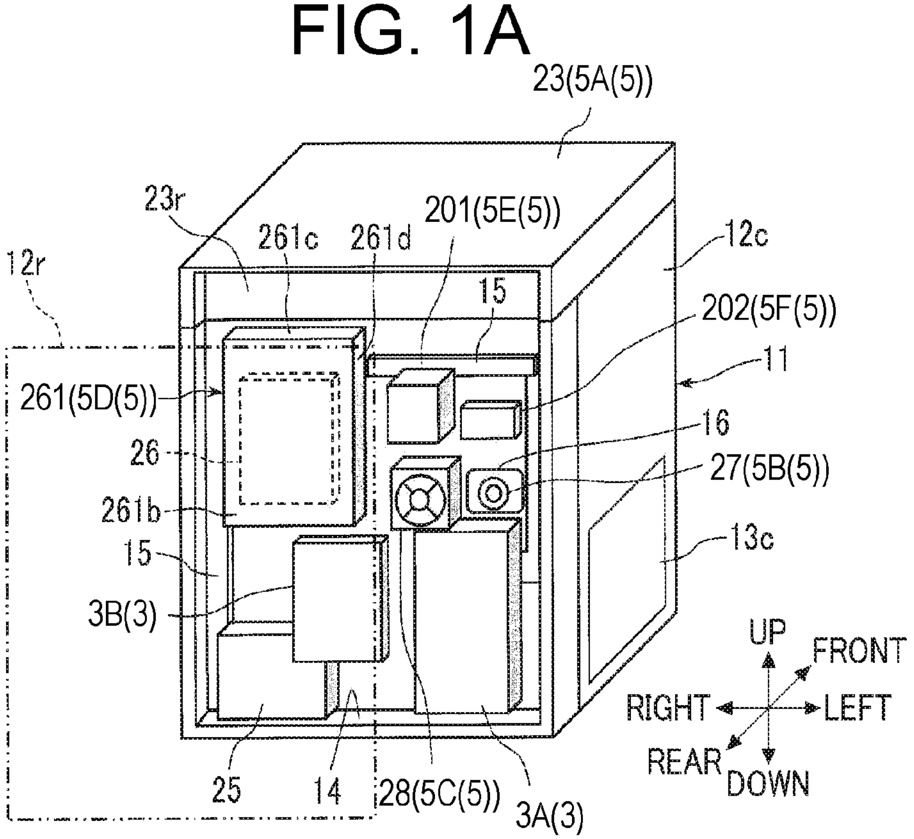
FIG. 1B is a schematic perspective view of the image forming apparatus of FIG. 1A in which a rear surface cover is removed, as viewed from an obliquely rear side.

FIGS. 1A and 1B show a circuit board-equipped apparatus 1 according to Exemplary Embodiment 1 of the present invention.

In the present specification and the drawings, substantially the identical components are denoted by the identical reference numerals. In addition, in the present specification, the duplicate description of the identical components will be omitted. Further, in the drawings, in order to ensure easy understanding, the illustration of a portion excluding a portion necessary for the description is substantially omitted.

(1) Overall Configuration of Circuit Board-Equipped Apparatus

The circuit board-equipped apparatus 1 is an apparatus that is equipped with at least a circuit board 3 which will be described below, an attachment plate 4 (not shown) to which the circuit board 3 is attached, and a structure 5 that requires work.

In Exemplary Embodiment 1, an image forming apparatus 10 is shown as an example of the circuit board-equipped apparatus 1.

The image forming apparatus 10 is an apparatus that forms an image corresponding to image information input from an image reading apparatus or an outside on paper, which is an example of a recording medium.

As shown in FIGS. 1A and 1B, the image forming apparatus 10, which is an example of the circuit board-equipped apparatus 1, includes a housing 11 having a predetermined shape.

The housing 11 is a box-shaped structural body formed in a predetermined appearance shape. The housing 11 is manufactured by, for example, variously combining a structural frame as a framework (not shown), an auxiliary member (not shown), an exterior material 12, and the like.

The auxiliary member is a partition member, an attachment member, or the like. The exterior material 12 is a front surface cover 12*f*, right and left surface covers 12*d* and 12*c*, a rear surface cover 12*r*, opening/closing covers 13*a*, 13*b*, and 13*c* of an open/closed type, or the like.

The housing 11 in Exemplary Embodiment 1 is configured as a structural body consisting of a substantially rectangular appearance shape.

The image forming apparatus 10 is an apparatus that forms the image corresponding to the image information input from the image reading apparatus or the outside on the paper, which is an example of the recording medium.

The image information is information on an element that is a target to be formed as an image. The image information is information having a content including at least one element of a text, a symbol, a figure, a table, a photograph, or a pattern.

As shown in FIG. 1A, the image forming apparatus 10 includes an image forming unit 21, a medium supply unit 22, and the like that are disposed in an internal space of the housing 11.

In addition, the image forming apparatus 10 includes an image reading unit 23 disposed on an upper portion of the housing 11, a discharge accommodation unit 24 provided in a portion of the housing 11 that is below the image reading unit 23, and the like.

The image forming unit 21 is a unit that directly forms the image corresponding to the image information on the paper or the like via a predetermined image forming method, or that transfers the image to the paper or the like after forming the image. As the image forming method, for example, an electrophotographic method, an ink jet method, and a thermosensitive method are used.

The medium supply unit 22 is a unit that accommodates the recording medium such as the paper that is a target for forming the image and transports and supplies the recording medium to the image forming unit 21. In the medium supply unit 22, a front surface portion of an accommodation body that accommodates the recording medium also serves as a part of the front surface cover 12*f* of the housing 11. A medium transport path (not shown) is provided between the medium supply unit 22 and the image forming unit 21.

The image reading unit 23 is a unit that reads the image of the document, and transmits the read image information to the image forming unit 21. The image reading unit 23 may include an automatic document transport unit that automatically transports the document as a reading target to the image reading unit 23.

The discharge accommodation unit 24 is a unit that discharges and accommodates the recording medium such as the paper on which the image is formed. A medium transport path (not shown) is provided between the image forming unit 21 and the discharge accommodation unit 24.

In a case where a control device 26, which will be described below, receives a command to perform an image formation operation, the image forming apparatus 10 performs a next image formation operation based on the control of the control device 26.

First, the image forming unit 21 forms the image corresponding to the input image information. On the other hand, in the medium supply unit 22, the recording medium such as the paper is supplied to the image forming unit 21 through the medium transport path. As a result, the image is formed on the recording medium.

Subsequently, the recording medium on which the image is formed is transported and accommodated such that the recording medium is discharged from the image forming unit 21 through the medium transport path and is discharged to the discharge accommodation unit 24. As a result, the image formation on one recording medium is completed.

Figure 3:
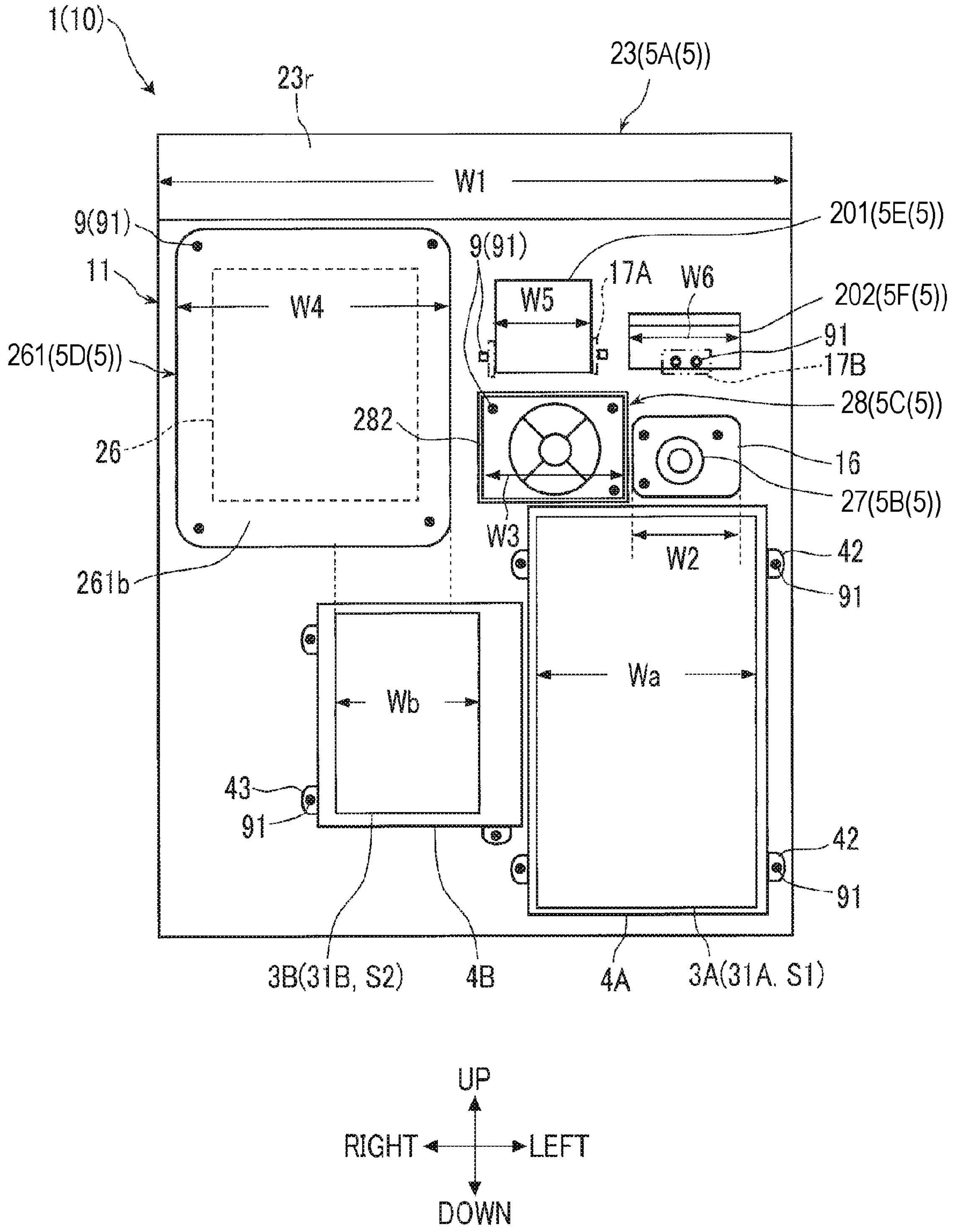
FIG. 3 is a schematic side view showing a relationship between a circuit board and an attachment plate.

In addition, as shown in FIG. 1B, FIG. 3, and the like, the image forming apparatus 10 includes a power supply device 25, the control device 26, a rotation drive device 27, a blowing device 28, circuit boards 3A and 3B, and the like that are disposed in a rear portion of the housing 11.

The image forming apparatus 10 shown in FIG. 1B or FIG. 3 is in a state of being viewed from a rear side in a case where the rear surface cover 12*r* as the exterior material 12 is removed.

In the image forming apparatus 10, in a case where the rear surface cover 12*r* is removed, as shown in FIG. 1B and the like, the power supply device 25 and the like disposed in the rear portion of the housing 11 are in a state of being exposed. In addition, in the image forming apparatus 10, in a case where the rear surface cover 12*r* is removed, the rear surface 23*r* of the image reading unit 23 is also in a state of being exposed.

The power supply device 25 is a device that adjusts electricity taken in from the outside to electricity with a required voltage, frequency, direct current, and the like for practical use, and outputs the electricity.

The power supply device 25 is installed in a bottom frame 14 or the like, which is one of the structural frames of the housing 11. The bottom frame 14 is formed in a form of a column, a rod, a plate, or the like.

The power supply device 25 in Exemplary Embodiment 1 is disposed to exist below the control device 26 as viewed from the rear side.

The control device 26 is a device that controls the overall operation or a part of the operation of the image forming apparatus 10 while receiving information required for a control operation.

Components that configure the control device 26 are, for example, an arithmetic processing device, a storage element, a storage device, an input/output device, and the like.

In the control device 26 in Exemplary Embodiment 1, as indicated by a broken line in FIG. 1B, the components configuring the device are disposed in the accommodation body 261.

As shown in FIG. 1B and the like, the accommodation body 261 includes a rear surface plate 261*b*, an upper surface plate 261*c*, a left surface plate 261*d*, a front surface plate, a lower surface plate, a right surface plate (which are not shown), and the like.

The rear surface plate 261*b* is a plate disposed rearward as viewed from a front-rear direction of the housing 11. The left surface plate 261*d* has a shape in which a portion through which the wiring cable passes is open.

The front in the front-rear direction is a front side on which a user of the image forming apparatus 10 faces. The rear in the front-rear direction is a side opposite to the front side.

In addition, the accommodation body 261 is attached by being screwed to a rear frame 15 which is one of the structural frames of the housing 11. The rear frame 15 is formed in a form of a column, a rod, a plate, or the like.

Therefore, the control device 26 is attached to a part of the rear frame 15 via the accommodation body 261.

The control device 26 in Exemplary Embodiment 1 is disposed to exist on an upper side of the rear frame 15 as viewed from the rear side. In addition, the control device 26 is disposed to exist obliquely above the circuit board 3B by the accommodation body 261.

The rotation drive device 27 is a device that outputs rotational power required for a driving unit in the image forming unit 21 or the like. The rotation drive device 27 is composed of, for example, components such as a motor and a gearbox.

The rotation drive device 27 is disposed to exist on an inner side of the housing 11. In addition, a part of the rotation drive device 27 is disposed in a state of being exposed from an inspection opening portion 16 formed between the rear frames 15.

The rotation drive device 27 in Exemplary Embodiment 1 is disposed to exist in a portion of an upper rear portion of the housing 11, which is on a side opposite to the control device 26, as viewed from the rear side. In addition, the rotation drive device 27 is disposed to exist above the circuit board 3A.

The blowing device 28 is a device that causes blowing that takes external air (outside air) into the housing 11 and discharges the external air to the outside of the housing 11. The blowing device 28 is composed of, for example, components such as a blower fan 281, a fan attachment frame 282, and a duct (not shown).

The blowing device 28 is attached by screwing the blower fan 281 to a part of the rear frame 15 via the fan attachment frame 282.

The blowing device 28 in Exemplary Embodiment 1 is disposed to exist in a portion of the upper portion of the rear frame 15 opposite to the control device 26 and between the control device 26 and the rotation drive device 27 as viewed from the rear side. In addition, the blowing device 28 is disposed to exist obliquely above the circuit boards 3A and 3B.

Further, the image forming apparatus 10 also includes an optional item or the like that is mounted on the rear portion of the housing 11.

The optional item is a device that is mounted by being selected by the user. Therefore, in the image forming apparatus 10, there may be no optional item in a case where the user does not select the optional item.

The optional item is, for example, a facsimile (FAX) communication device 201, a universal serial bus (USB) connection device 202, and the like. The image reading unit 23 may be one of the optional items.

The FAX communication device 201 is a communication device for converting the image (including the text) of the document into an electric signal and transmitting and receiving the electric signal through a communication line. The FAX communication device 201 is provided with an insertion port (not shown) into which a connection terminal such as a communication line or a network cable is inserted.

The FAX communication device 201 is disposed to exist on a side of the control device 26 and above the blowing device 28 as viewed from the rear side. In addition, the FAX communication device 201 is disposed to exist obliquely above the circuit boards 3A and 3B.

The USB connection device 202 is a device that enables connection of a USB device. The USB connection device 202 is provided with a USB port (not shown) into which the USB device or a USB cable connector is inserted.

The USB connection device 202 is disposed to exist on a side of the control device 26 and the FAX communication device 201 and above the rotation drive device 27 as viewed from the rear side. In addition, the USB connection device 202 is disposed to exist above the circuit board 3A.

Figure 2:
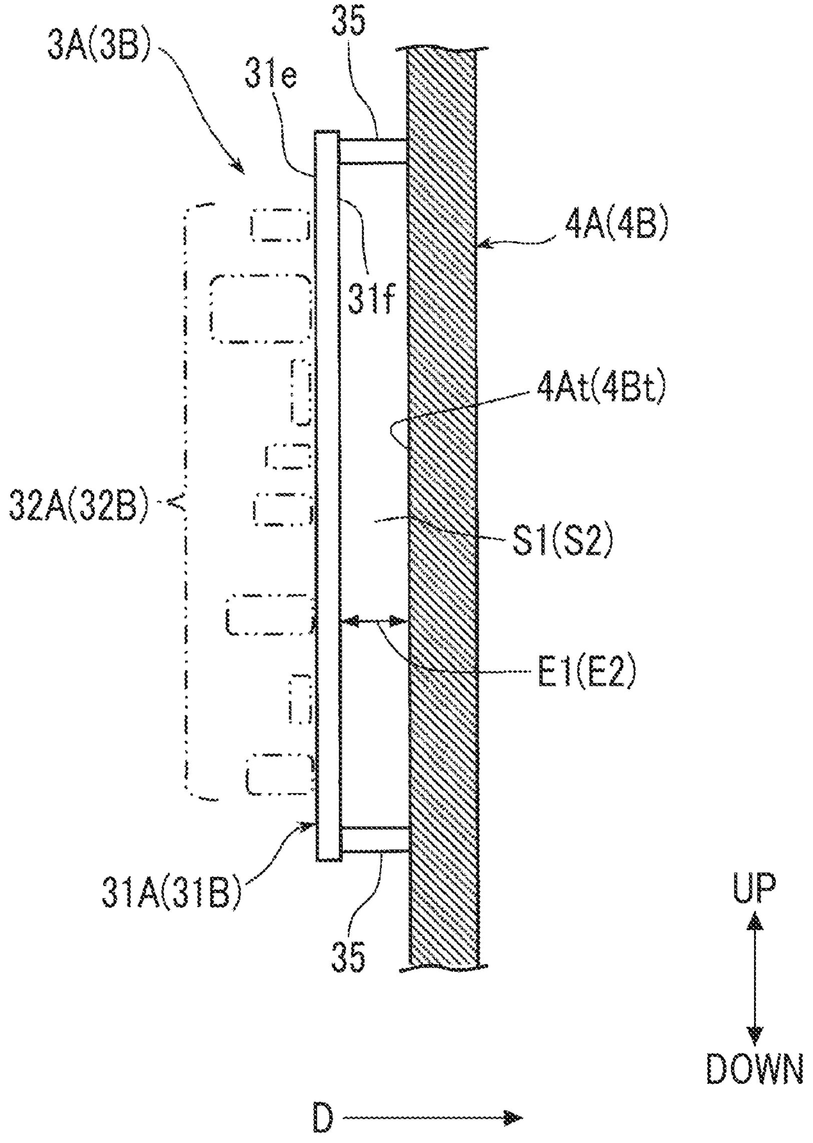
FIG. 2 is a schematic view of a rear surface of the image forming apparatus of FIG. 1B after the rear surface cover is removed, as viewed from a directly rear side.

As shown in FIG. 2, FIG. 3, and the like, the circuit boards 3A and 3B are formed by mounting circuit components 32A and 32B on substrates 31A and 31B, respectively, to form predetermined circuits.

Both the substrates 31A and 31B are plate-shaped members in which an attachment portion for a wiring or the circuit component 32 is formed. Such substrates 31A and 31B are referred to as, for example, a printing wiring board.

The substrates 31A and 31B in Exemplary Embodiment 1 have a mounting surface 31*e* on which the circuit components 32A and 32B are attached and mounted, and a back surface 31*f* thereof, as shown in FIG. 2.

In addition, the substrates 31A and 31B are not limited to single-side mounting type substrates on which the circuit component is mounted on one surface, and may be double-side mounting type substrates on which the circuit component is mounted on both surfaces. Further, the substrates 31A and 31B may be substrates having a multilayer structure.

The circuit components 32A and 32B are components used to configure an electronic circuit or an electric circuit.

The circuit components 32A and 32B are components referred to as so-called active element, passive element, auxiliary component, and the like.

The active element is a transistor, a diode, an integrated circuit (IC), or the like. The passive element is a resistance, a coil, a capacitor, a transformer, or the like. The auxiliary component is a relay, a switch, a connector, a wiring, or the like.

The circuit board 3A in Exemplary Embodiment 1 is configured as, for example, a transformer circuit board. The circuit board 3A is disposed to exist on one side of the lower portion of the rear frame 15 as viewed from the rear side. In addition, the circuit board 3A is disposed to exist below the image reading unit 23 and below the rotation drive device 27, the blowing device 28, and the like.

In addition, the circuit board 3B in Exemplary Embodiment 1 is configured as, for example, a power supply circuit board. The circuit board 3B is disposed to exist on one side opposite to the circuit board 3A in the lower portion of the rear frame 15 as viewed from the rear side. In addition, the circuit board 3B is disposed to exist below the image reading unit 23 and below the control device 26, the blowing device 28, and the like.

The circuit board 3A is attached to an attachment plate 4A as shown in FIG. 2 or FIG. 3.

An arrow D in FIG. 2 indicates a depth direction from the circuit boards 3A and 3B and the like toward the respective attachment plates 4A and 4B and the like. The depth direction D in Exemplary Embodiment 1 is a direction identical to a direction from the rear side horizontally toward the front side in the front-rear direction.

The depth direction D used in the present specification is not limited to the depth direction from the front side toward the rear side, which is generally used. For example, in a case where the circuit board 3A and the attachment plate 4A are disposed on a left side surface portion of the housing 11, the depth direction D from the circuit board 3A toward the attachment plate 4A is a direction identical to a direction from the left side toward the right side of the housing 11.

The attachment plate 4A is a plate-shaped member.

As the attachment plate 4A in Exemplary Embodiment 1, for example, as shown in FIG. 2 or FIG. 3, a metal plate having an attachment surface 4At having a shape slightly wider than the substrate 31A of the circuit board 3A is used.

The attachment plate 4A is not limited to have a surface on which the entire plate surface is blocked, and may have an opening portion in a part of the plate surface.

As schematically shown in FIG. 2, in the circuit board 3A, the substrate 31A is attached to the attachment plate 4A by fixing means such as screwing through a plurality of support materials 35.

The support material 35 also serves as a gap holding member that holds an interval E1 between the substrate 31A and the attachment plate 4A in a predetermined dimension.

The interval E1 is a distance between the back surface 31*f* of the substrate 31A and the attachment surface 4At of the attachment plate 4A. The interval E1 is also an interval of a gap S1, which will be described below, between the substrate 31A of the circuit board 3A and the attachment plate 4A.

In addition, as shown in FIG. 3, the attachment plate 4A is attached by screwing and fixing a plurality of fixing portions 42 provided to protrude at predetermined positions of an outer peripheral portion of the attachment plate 4A to the rear frame 15 or the bottom frame 14 of the housing 11.

Figure 4:
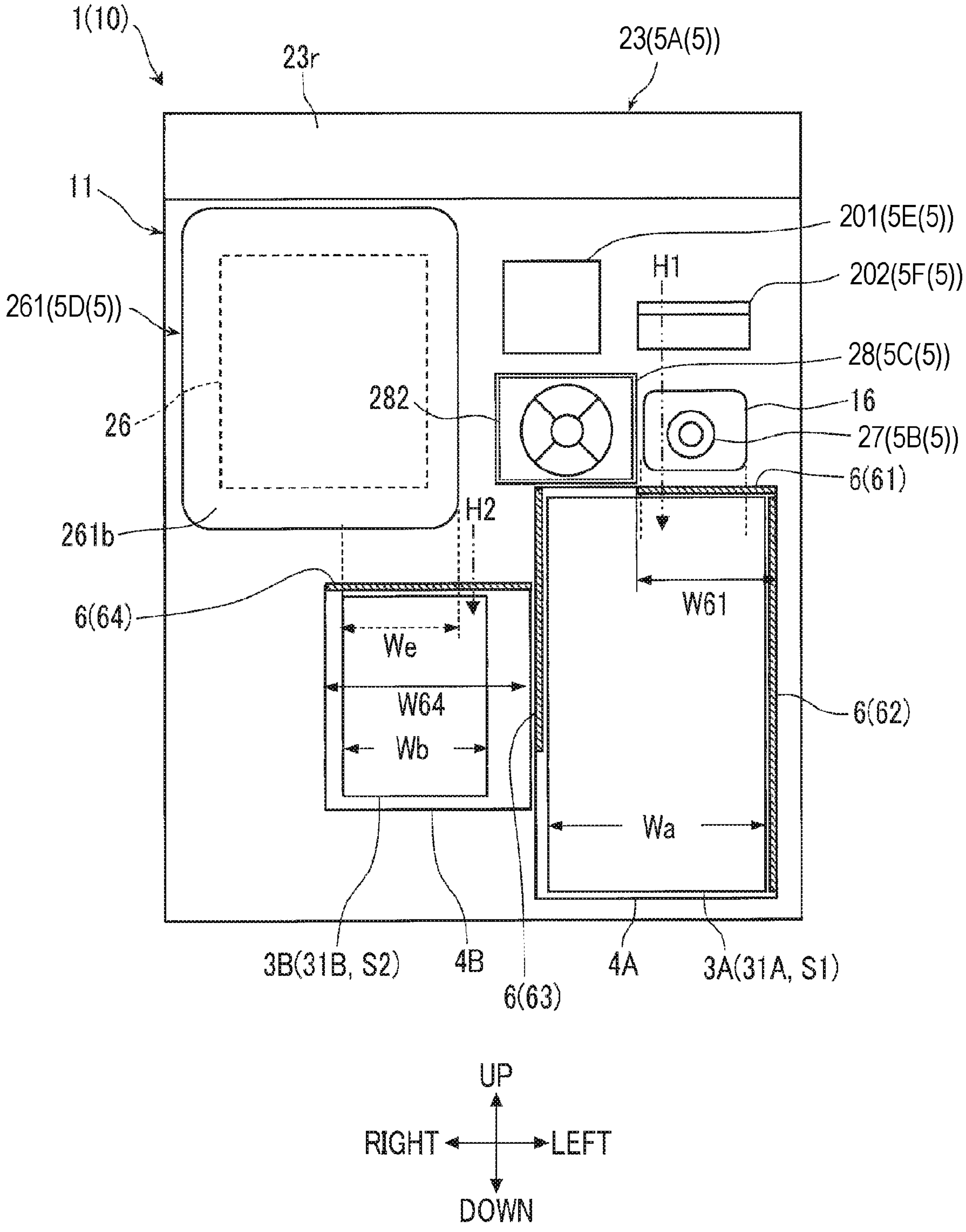
FIG. 4 is a schematic view showing a state where a blocking member is provided in the image forming apparatus of FIG. 1B.

The circuit board 3B is attached to the attachment plate 4B as shown in FIG. 2 or FIG. 4.

The attachment plate 4B is a plate-shaped member.

As the attachment plate 4B in Exemplary Embodiment 1, as shown in FIG. 2 or FIG. 3, a metal plate having an attachment surface 4Bt having a shape slightly wider than the substrate 31B of the circuit board 3B is used.

In addition, the attachment plate 4B is not limited to have a surface on which the entire plate surface is blocked as in a case of the attachment plate 4A, and may have an opening portion in a part of the plate surface.

As schematically shown in FIG. 2, in the circuit board 3B, the substrate 31B is attached in a state of being fixed to the attachment plate 4B by fixing means such as screwing through a plurality of support materials 35. In this case, the substrate 31B is maintained in a state where an interval E2 is formed with the support material 35 with respect to the attachment plate 4B. The interval E2 is not limited to have the identical dimension to the interval E1 is used, and may have a different dimension.

In addition, as shown in FIG. 3, the attachment plate 4B is attached by screwing and fixing a plurality of fixing portions 43 provided at predetermined positions of an outer peripheral portion of the attachment plate 4B to the rear frame 15.

(2) Blocking Member in Circuit Board-Equipped Apparatus

In the image forming apparatus 10, which is an example of the circuit board-equipped apparatus 1, as shown in FIG. 4, a blocking member 6 is provided.

The blocking member 6 is an example of a member that blocks at least a part of a route along which an article 9 falling from above due to the work on the structure 5 that requires the work moves toward the gaps S1 and S2 (see FIG. 2) between the circuit boards 3A and 3B, and the attachment plates 4A and 4B.

Here, the article 9 is an article having a shape and a size that allow the article 9 to fall due to the work on the structure 5 and to enter the gaps S1 and S2.

Such an article 9 is largely a fixture such as a screw 91, and for example, a stapler needle, small stationery such as a clip (paper fastener), and other small components are used. The article 9, such as the stapler needle and the clip, is an article that is placed and forgotten in a part of the image reading unit 23 or that mistakenly falls before the work and remains in a part of the rear surface 23*r*.

In addition, the work is work related to the attachment and removal (attachment and detachment), maintenance (inspection), repair, and the like of the apparatus or the component.

These types of the work include work related to a device or a component that is already mounted, as well as work related to a device or a component that is mounted later, such as the optional item. In addition, these types of the work are not limited to manual work performed by a human hand, and also include automatic work using a robot or the like.

In addition, the structure 5 is the structure 5 that is disposed above at least one of the circuit board 3A or 3B as viewed in a positional relationship in a vertical up-down direction among the structures 5 that require the work, as shown in FIG. 3 and the like.

In Exemplary Embodiment 1, the image reading unit 23, the accommodation body 261 of the control device 26, the rotation drive device 27, the blowing device 28, the FAX communication device 201, the USB connection device 202, and the like correspond to the structures 5 that require the work. In addition, in Exemplary Embodiment 1, for convenience, as shown in FIG. 3 and the like, the image reading unit 23 may be handled as a structure 5A, the rotation drive device 27 may be handled as a structure 5B, the blowing device 28 may be handled as a structure 5C, the accommodation body 261 may be handled as a structure 5D, the FAX communication device 201 may be handled as a structure 5E, and the USB connection device 202 may be handled as a structure 5F.

The work on the structure 5 includes, specifically, work of attaching and detaching the image reading unit 23, the accommodation body 261, the rotation drive device 27, the blowing device 28, and the like, or work of removing or attaching the screw 91 of a portion to be screwed in a case of the work related to maintenance or repair.

In addition, in a case where the FAX communication device 201 and the USB connection device 202, which are the optional items, are mounted later, the work on the structure 5 may include work related to the later mounting. The work in this case includes, for example, as shown in FIG. 3, work of screwing the FAX communication device 201 to an attachment member 17A, such as a bracket, with the screw 91. The work in this case also includes work of screwing the USB connection device 202 to an attachment member 17B with the screw 91.

Further, at least a part of the route means that there are many possible routes as the route along which the falling article 9 moves toward the gaps S1 and S2, but there is no problem to limit the route to a route predicted that the article 9 is likely to enter the gaps S1 and S2 among the many routes.

In other words, the meaning is that, among many routes, a route predicted that the article 9 is unlikely to enter the gaps S1 and S2 or a route that is already blocked by another member may be excluded from the route.

Arrows H1 and H2 indicated by two-point chain lines in FIG. 4 and the like are specific examples of at least a part of the many routes.

The routes indicated by the arrows H1 and H2 are respective examples of the routes toward the upper end portions of the gaps S1 and S2. In addition, both the routes indicated by the arrows H1 and H2 are also routes in a case where the article naturally falls under the action of gravity.

FIGS. 3 and 4 schematically show a rear surface of the housing 11 in a case where the rear surface cover 12*r* is removed. In FIGS. 3 and 4, the gaps S1 and S2 exist rearward (forward in the front-rear direction) of the circuit boards 3A and 3B (substrates 31A and 31B thereof) in the substantially identical shape and size to the circuit boards 3A and 3B (substrates 31A and 31B thereof).

The blocking member 6 is provided in at least a part of a range from the structure 5 to the circuit boards 3A and 3B.

At least a part of the range from the structure 5 to the circuit boards 3A and 3B is not limited to the entire range, and may be a required part of the range.

Further, a shape or a form of the blocking member 6 is not particularly limited as long as the blocking member 6 can prevent the falling article 9 from passing.

In Exemplary Embodiment 1, as shown in FIG. 4 and the like, an upper blocking member 61, a left side blocking member 62, and a right side blocking member 63 are provided around the circuit board 3A as the blocking member 6.

The upper blocking member 61, the left side blocking member 62, and the right side blocking member 63 are all formed of a plate-shaped member. The upper blocking member 61, the left side blocking member 62, and the right side blocking member 63 are all provided on the attachment plate 4A of the circuit board 3A.

As shown in FIG. 4, the upper blocking member 61 is provided in a remaining portion excluding a portion in which the fan attachment frame 282 of the blowing device 28 exists, in the upper end of the attachment plate 4A.

This is for the following reason. That is, a portion of the gap S1 between a part of the upper end of the circuit board 3A and the attachment plate 4A corresponding to the part of the upper end is in a state of being covered and hidden from above by a part of the fan attachment frame 282 of the blowing device 28. Therefore, the upper blocking member 61 need not be provided on a part of the upper end of the attachment plate 4A corresponding to the part of the upper end of the circuit board 3A, and need only be provided on the remaining portion excluding the part of the upper end of the attachment plate 4A.

In addition, the upper blocking member 61 is provided in a part of a range from the image reading unit 23 serving as the structure 5A, the USB connection device 202 serving as the structure 5F, and the rotation drive device 27 serving as the structure 5B to the circuit board 3A.

Figure 5:
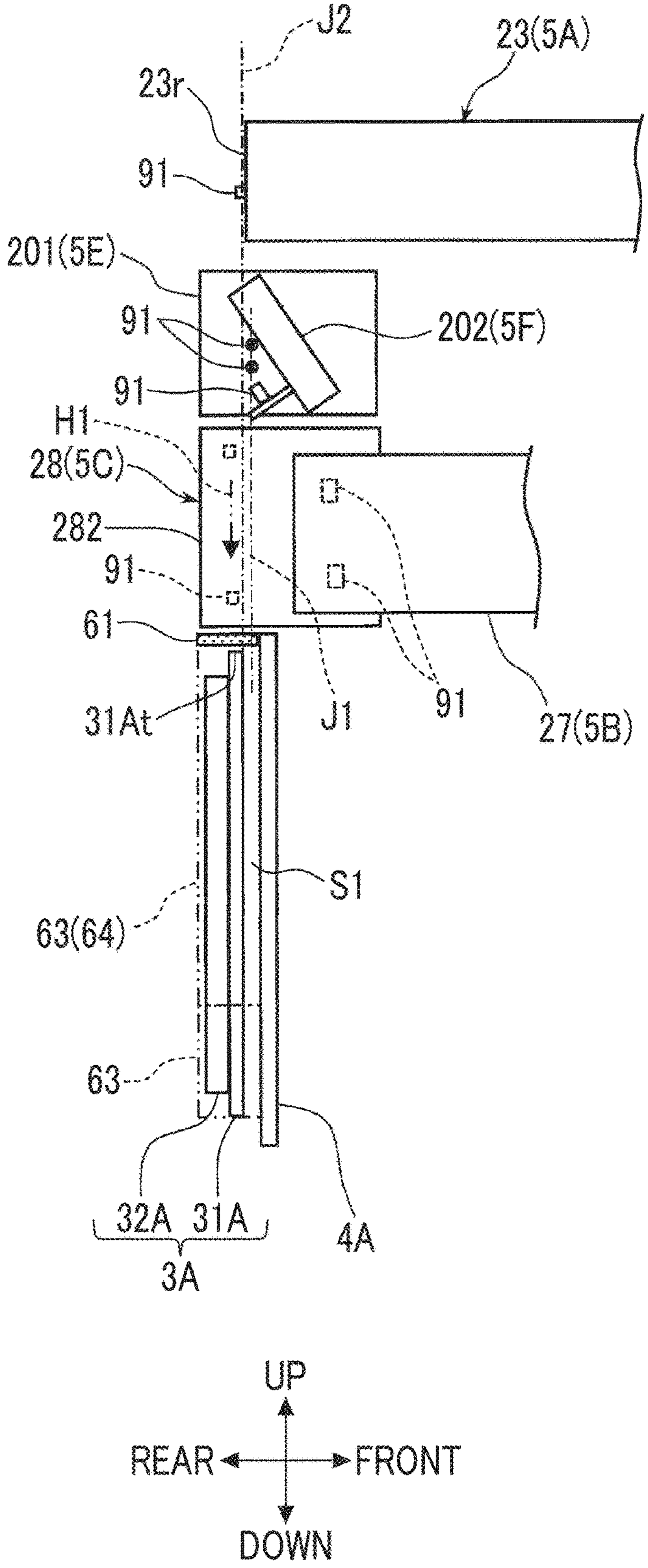
FIG. 5 is a schematic side view showing a state of one circuit board, a structure, and a blocking member.

Further, as shown in FIG. 5, the upper blocking member 61 is provided in a state where the upper blocking member 61 rises from the upper end (upper edge) of the attachment plate 4A toward the circuit board 3A, and the raised distal end portion thereof passes over an upper end (upper edge) 31At of the substrate 31A of the circuit board 3A.

In this case, as shown in FIG. 4 or FIG. 5, the upper blocking member 61 is provided in a state of being in contact with or approaching the upper end (upper edge) of the substrate 31A.

The approach state related to the blocking member 6 refers to a state where a gap exists to an extent that the article 9 cannot pass between the blocking member 6 and a member to which the blocking member 6 approaches (the same applies hereinafter).

The left side blocking member 62 is provided along substantially the entire region of the left side end (left edge portion) of the attachment plate 4A in the up-down direction.

In addition, the left side blocking member 62 is provided in a state of being in contact with or approaching the left end lower surface of the upper blocking member 61.

Further, as indicated by a two-dot broken line in FIG. 5, the left side blocking member 62 is provided in a state where the left side blocking member 62 rises from the left end (left edge) of the attachment plate 4A toward the circuit board 3A, and the raised distal end portion thereof passes over the left end (left edge) of the substrate 31A of the circuit board 3A. In this case, as shown in FIG. 4, the left side blocking member 62 is provided in a state of being in contact with or approaching the left end (left edge) of the substrate 31A.

The right side blocking member 63 is provided along substantially the upper half of the right side end (right edge) of the attachment plate 4A in the up-down direction.

In addition, the right side blocking member 63 is provided in a state of extending downward from the right end of the upper end (upper edge) of the attachment plate 4A.

Further, as indicated by a two-dot broken line in FIG. 5, the right side blocking member 63 is provided in a state where the right side blocking member 63 rises from the right side end (right edge) of the attachment plate 4A toward the circuit board 3A, and the raised distal end portion thereof passes over the right side end (right edge) of the substrate 31A of the circuit board 3A. In this case, as shown in FIG. 4, the right side blocking member 63 is provided in a state of being in contact with or approaching the right side end (right edge) of the substrate 31A.

Next, in Exemplary Embodiment 1, as shown in FIG. 4 and the like, the upper blocking member 64 is provided as the blocking member 6 around the circuit board 3B.

The upper blocking member 64 is formed of a plate-shaped member. The upper blocking member 64 is provided on the attachment plate 4B of the circuit board 3B.

In addition, the upper blocking member 64 is provided in a part of each range from the image reading unit 23 serving as the structure 5A and the accommodation body 261 serving as the structure 5D to the circuit board 3B.

In addition, the upper blocking member 64 can also be said to be provided in a part of each range from the FAX communication device 201 serving as the structure 5E and the blowing device 28 serving as the structure 5C to the circuit board 3B.

In addition, the upper blocking member 64 is provided in a state where the left end thereof approaches the right side blocking member 63 provided on the circuit board 3A side.

Figure 6:
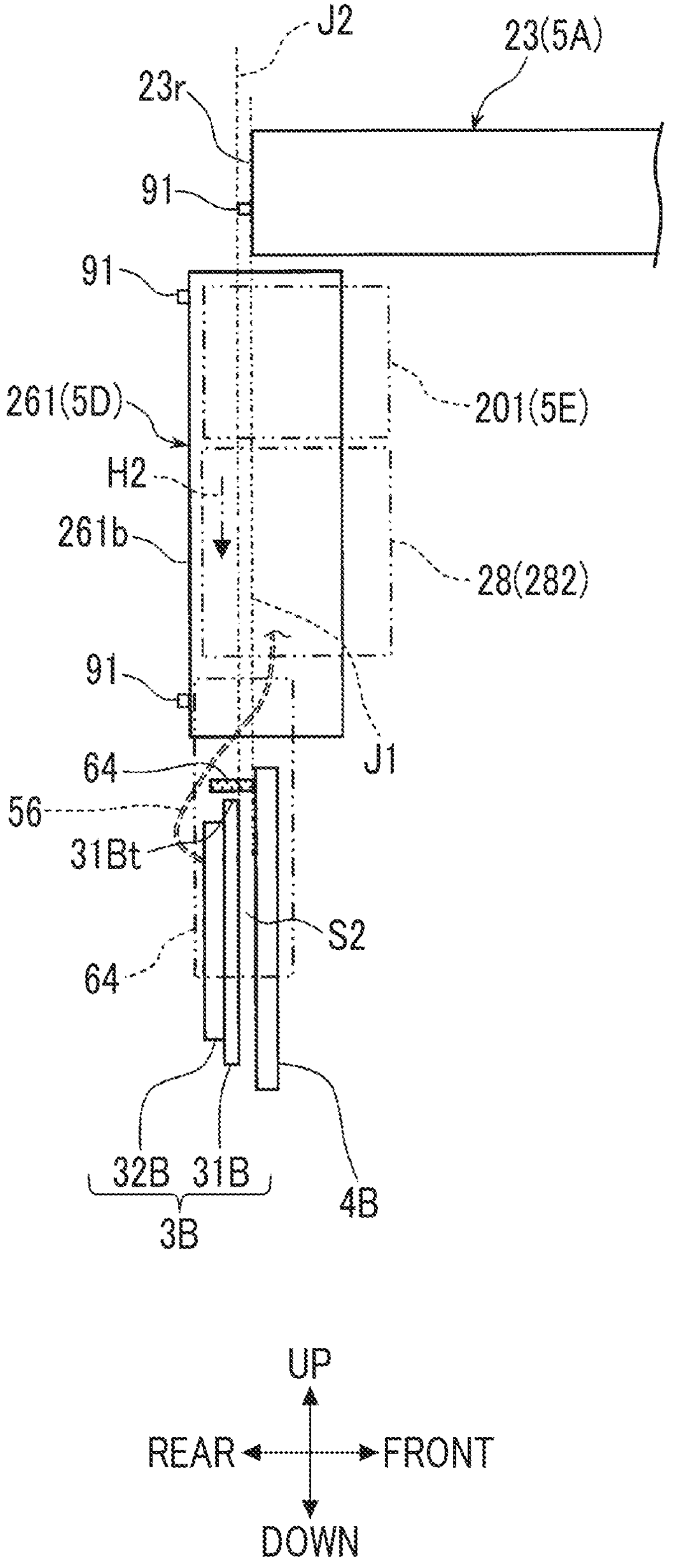
FIG. 6 is a schematic side view showing a state of another circuit board, the structure, and the blocking member.

Further, as shown in FIG. 6, the upper blocking member 64 is provided in a state where the upper blocking member 64 rises from the upper end (upper edge) of the attachment plate 4B toward the circuit board 3B, and the raised distal end portion thereof slightly passes over an upper end (upper edge) of the substrate 31B of the circuit board 3B.

In this case, as shown in FIG. 4 or FIG. 6, the upper blocking member 64 is provided in a state of being in contact with or approaching an upper end (upper edge) 31Bt of the substrate 31B.

The reason why the upper blocking member 64 is provided to the extent that the upper blocking member 64 slightly passes over the upper end of the substrate 31B is as follows.

Figure 8A:
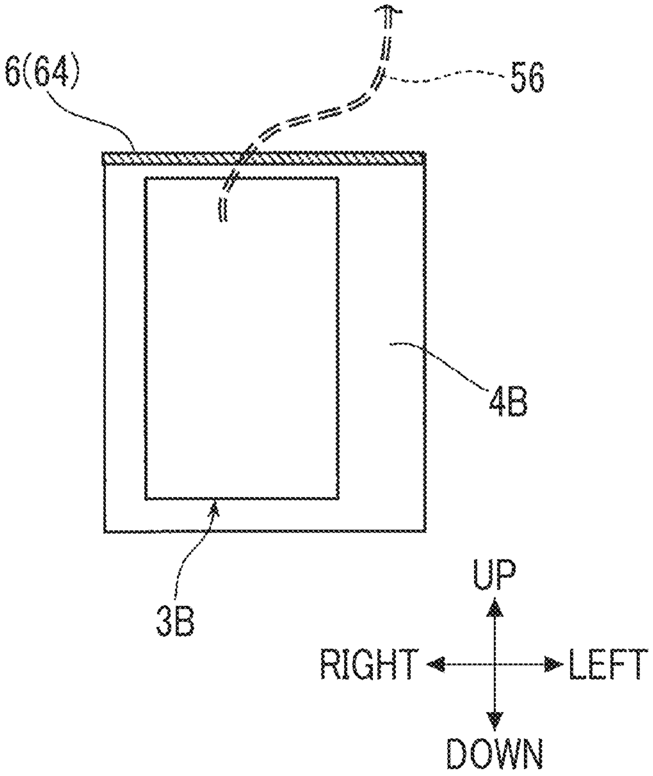
FIG. 8A is a schematic perspective view of a major part of another upper blocking member of FIG. 7B and components around the upper blocking member as viewed from an obliquely rear side.
Figure 8B:
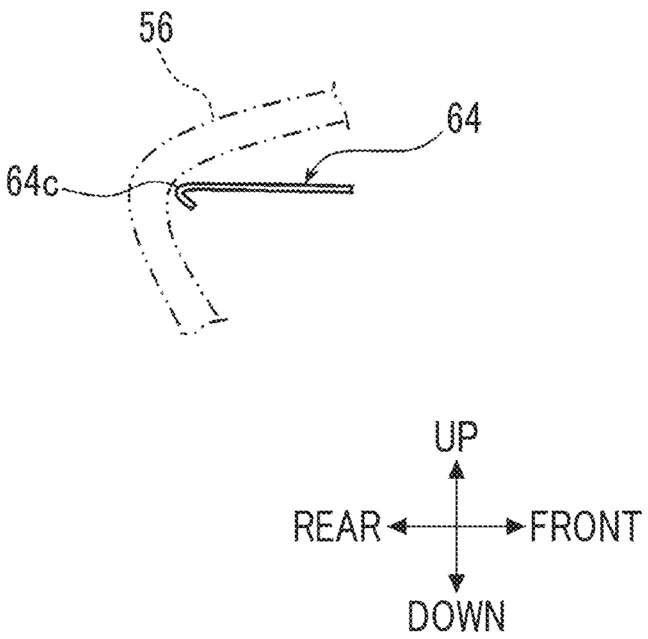
FIG. 8B is a schematic view showing a configuration of the upper blocking member of FIG. 8A.

That is, in the circuit board 3B, as shown in FIG. 6 or FIGS. 8A and 8B, there is need to secure a space through which a plurality of wiring cables 56 connected to the circuit component 32B or the like of the circuit board 3B pass by being led toward other connection destinations above the circuit board 3B. Therefore, the upper blocking member 64 cannot be provided in a state of largely passing over the upper end of the substrate 31B as compared with the upper blocking member 61 provided on the upper end side of the circuit board 3A that does not allow the wiring cable 56 to pass, for example.

Incidentally, the image reading unit 23 serving as the structure 5A is disposed in a state where the rear surface 23*r* is located rearward of a second imaginary plane J2 as shown in FIG. 5 or FIG. 6.

The second imaginary plane J2 is a plane that imaginarily extends upward in the vertical direction from each of the upper ends 31At and 31Bt of the substrates 31A and 31B of the circuit boards 3A and 3B. In addition, the state being located rearward in this case refers to a state of being shifted to the inner side of the image forming apparatus 10 or the housing 11 with respect to the second imaginary plane J2. The state of being located rearward in Exemplary Embodiment 1 is a state of being shifted to the front side with respect to the second imaginary plane J2 as viewed in the front-rear direction of the image forming apparatus 10 or the like.

In addition, the rotation drive device 27 serving as the structure 5B is also disposed in a state of being located rearward of the second imaginary plane J2, as in a case of the image reading unit 23.

Further, both the rear surface 23*r* of the image reading unit 23 and the rotation drive device 27 are disposed rearward of the circuit boards 3A and 3B as shown in FIG. 5 and the like.

Therefore, in a case where the screw 91 as the article 9 to be handled in the work on the rear surface 23*r* of the image reading unit 23 or the rotation drive device 27 has fallen, the screw 91 is likely to move toward the gap S1, S2 between the circuit boards 3A and 3B and the attachment plates 4A and 4B.

In addition, the blowing device 28 serving as the structure 5C, the FAX communication device 201 serving as the structure 5E, and the USB connection device 202 serving as the structure 5F are disposed in a state where the rear portions thereof are located forward of the second imaginary plane J2 as shown in FIG. 5.

The state of being located forward in this case refers to a state of being shifted to the outer side of the image forming apparatus 10 or the housing 11 with respect to the second imaginary plane J2. The state of being located forward in Exemplary Embodiment 1 is a state of being shifted to the rear side with respect to the second imaginary plane J2 as viewed in the front-rear direction of the image forming apparatus 10 or the like.

Meanwhile, as shown in FIG. 5, the FAX communication device 201 and the USB connection device 202 are disposed in a state where a first imaginary plane J1 overlaps at least a part of the gap S1.

The first imaginary plane J1 is a plane that imaginarily extends downward in the vertical direction from the portion of the structure 5 that requires the work. In addition, the portion that requires the work is a portion of the structure 5 on which the work is actually performed. The portion that requires the work is, for example, a portion (screw hole or screw attachment portion) to which the screw 91 is attached.

Therefore, in a case where the screw 91 as the article 9 to be handled in the work on the FAX communication device 201 or the USB connection device 202 has fallen, the screw 91 is likely to move toward the gap S1 between the circuit board 3A and the attachment plate 4A. In addition, in a case where the gap S2 is in substantially identical positional relationship with the gap S1 in the front-rear direction, the falling screw 91 may also move toward the gap S2 between the circuit board 3B and the attachment plate 4B.

In this regard, in the image forming apparatus 10, which is an example of the circuit board-equipped apparatus 1, since the upper blocking members 61 and 64 as the blocking members 6 are provided, even in a case where the article 9, such as the screw 91, has fallen due to the work related to the structure 5, the article 9 is prevented from entering the gap S1 and S2 between the circuit boards 3A and 3B and the attachment plates 4A and 4B.

That is, as shown in FIG. 5 or FIG. 6, the article 9 that has fallen due to the work related to the structure 5 is prevented from entering the gaps S1 and S2 because the upper blocking members 61 and 64 block the respective routes toward the gaps S1 and S2.

Specifically, for the article 9 that falls and moves toward the portions above the gaps S1 and S2 due to the work related to the image reading unit 23, the accommodation body 261, the rotation drive device 27, the blowing device 28, the FAX communication device 201, and the USB connection device 202, the respective routes toward the portions above the gaps S1 and S2 are blocked by the upper blocking members 61 and 64 disposed at the positions above the gaps S1 and S2. As a result, the article 9 falling and moving toward the portions above the gaps S1 and S2 is prevented from entering the gaps S1 and S2 from above.

In addition, in the image forming apparatus 10, for the article 9 that falls and moves toward the right and left side portions of the gap S1, the respective routes toward the right and left side portions of the gap S1 are also blocked by the existence of the right side blocking member 63 and the left side blocking member 62 disposed at the positions of the right and left sides of the gap S1. As a result, the article 9 falling and moving toward the right and left side portions of the gap S1 is prevented from entering the gap S1 from the right and left side portions of the gap S1.

In particular, in the image forming apparatus 10, for the article 9 that falls and tries to move toward the left side portion of the gap S2, the route toward the left side portion of the gap S2 is blocked by the existence of the right side blocking member 63 provided on the circuit board 3A side that is substantially adjacent to the circuit board 3B. Therefore, the article 9 falling and moving toward the left side portion of the gap S2 is prevented from entering the gap S2 from the left side portion of the gap S2.

Such actions and effects can also be obtained in a case where the first imaginary plane J1 in the FAX communication device 201 or the USB connection device 202 is disposed to exist rearward of the gap S1.

To exist rearward in this case means to exist in a state of being shifted to the inner side of the image forming apparatus 10 or the housing 11 with respect to the first imaginary plane J1. To exist rearward in Exemplary Embodiment 1 is a state of being shifted to the front side with respect to the first imaginary plane J1 as viewed in the front-rear direction of the image forming apparatus 10 or the like.

Further, with the image forming apparatus 10, which is an example of the circuit board-equipped apparatus 1, the blocking member 6 is provided, so that work of checking whether or not the article 9 enters the gaps S1 and S2 and stops in the middle of entering can be omitted.

Specifically, disassembling work of removing and disassembling the circuit boards 3A and 3B from the attachment plates 4A and 4B, respectively, or disassembling work of removing the circuit boards 3A and 3B integrally with the attachment plates 4A and 4B, and then removing and disassembling the circuit boards 3A and 3B from the attachment plates 4A and 4B can be omitted.

With the image forming apparatus 10, the existence of the blocking member 6 may prevent the article from falling from above unexpectedly during movement, during operation, or the like, in addition to the article 9 falling due to the work on the structure 5, from entering the gaps S1 and S2 between the circuit boards 3A and 3B and the attachment plates 4A and 4B.

(3) Positional Relationship between Circuit Board and Structure and Form of Blocking Member The circuit boards 3A and 3B in Exemplary Embodiment 1 are both disposed below the image reading unit 23 serving as the structure 5A.

In addition, as shown in FIG. 3, the circuit boards 3A and 3B are disposed respectively in positional relationships in which the surfaces of the substrates 31A and 31B of the circuit boards 3A and 3B exist inside a maximum width W1 of the image reading unit 23.

The maximum width W1 of the image reading unit 23 serving as the structure 5A is a distance (dimension) between both end portions of the image reading unit 23 in the horizontal direction. The horizontal direction with respect to the maximum width W1 in Exemplary Embodiment 1 also corresponds to the right-left direction of the image forming apparatus 10 or the housing 11.

In a case where the circuit boards 3A and 3B are disposed in the above-described positional relationship with the image reading unit 23 serving as the structure 5A, for example, it is desirable that the upper blocking member 64 is provided such that a width W64 thereof is equal to or larger than a maximum width Wb of the circuit board 3B as shown in FIG. 4. On the other hand, the upper blocking member 61 in Exemplary Embodiment 1 is not provided such that a width W61 thereof is equal to or larger than a maximum width Wa of the circuit board 3A. This is because the fan attachment frame 282 exists in a part of the gap S1 between the circuit board 3A and the attachment plate 4A, so that there is no need to provide the upper blocking member 61 in the part of the gap S1.

The width W61 of the upper blocking member 61 and the width W64 of the upper blocking member 64 are, for example, distances (dimensions) between both end portions of the image reading unit 23 serving as the structure 5A in the horizontal direction corresponding to the maximum width W1. In addition, the maximum widths Wa and Wb of the circuit boards 3A and 3B are distances (dimensions) between both ends in the horizontal direction of the surfaces of the substrate 31A and 31B, which are surfaces intersecting the depth direction D of the circuit boards 3A and 3B.

However, the upper blocking member 61 in Exemplary Embodiment 1 is not provided such that the width W61 thereof is equal to or larger than the maximum width Wa of the circuit board 3A.

This is for the following reason. That is, the gap S1 in Exemplary Embodiment 1 is in a state where a part thereof is covered and hidden from above by a part of the fan attachment frame 282 of the blowing device 28 as described above. Therefore, there is no need to provide the upper blocking member 61 in a part of the circuit board 3A corresponding to the covered and hidden part of the gap S1.

As a result, the upper blocking member 61 has the width W61 smaller than the maximum width Wa of the circuit board 3A.

In a case where the upper blocking member 64 is provided such that the width W64 thereof is equal to or larger than the width corresponding to the maximum width Wb of the circuit board 3B, the entire upper end of the gap S2 can be in a state of being covered and hidden or blocked by the upper blocking member 64 at the upper position of the gap S2.

As a result, in the image forming apparatus 10, for example, as compared with a case where the upper blocking member 64 is provided with a width smaller than the maximum width Wb of the circuit board 3B, the upper blocking member 64 blocks the route of the article 9 that tries to enter the gap S2 from above without omission, and the article 9 is accurately prevented from entering the gap S2 from above.

In addition, in a case where a positional relationship with the accommodation body 261 serving as the structure 5D disposed at the nearest position above the circuit board 3B is considered, the circuit board 3B is disposed in the following positional relationship. That is, as shown in FIG. 4, the circuit board 3B is disposed in a positional relationship in which a part of the surface of the substrate 31B of the circuit board 3B exists inside a maximum width W4 (see FIG. 3) of the accommodation body 261.

The maximum width W4 of the accommodation body 261 is the maximum width of the rear surface plate 261*b* of the accommodation body 261 in the horizontal direction.

In a case where the circuit board 3B is disposed in the positional relationship with the accommodation body 261 serving as the structure 5D, for example, it is desirable that the upper blocking member 64 is provided such that the width W64 thereof is the following width.

That is, for example, it is desirable that the upper blocking member 64 in this case is provided such that the width W64 thereof is equal to or larger than a width We corresponding to the part of the surface of the substrate 31B of the circuit board 3B as shown in FIG. 4.

The part is a portion of the surface of the substrate 31B of the circuit board 3B existing inside the maximum width W4 (see FIG. 3) of the accommodation body 261. In addition, the width W64 of the upper blocking member 64 in this case is a width maintained in a state of at least overlapping with a portion of the width We corresponding to the part of the surface of the substrate 31B of the circuit board 3B.

The upper blocking member 64 in Exemplary Embodiment 1 is provided such that the width W64 thereof is larger than the width corresponding to the part of the surface of the substrate 31B of the circuit board 3B, as shown in FIG. 4.

As a result, in the image forming apparatus 10, for example, as compared with a case where the upper blocking member 64 is provided such that the width W64 is smaller than the width We in which a part of the surface of the substrate 31B of the circuit board 3B exists inside the maximum width W4 of the accommodation body 261 serving as the structure 5D, the falling article 9 is prevented from entering the gap S2.

Specifically, the article 9, which falls toward the portion of the gap S2 having the width We corresponding to the part of the surface of the substrate 31B of the circuit board 3B, is prevented from entering from the portion of the width We of the gap S2.

Further, in a case where a positional relationship with the rotation drive device 27 serving as the structure 5B disposed at the nearest position above the circuit board 3A is considered, the circuit board 3A is disposed in the following positional relationship. That is, the circuit board 3A is disposed in a positional relationship in which the surface of the substrate 31A thereof overlaps with a maximum width W2 (see FIG. 3) of the rotation drive device 27 and exists to have a width larger than the maximum width W2, as shown in FIG. 4.

The maximum width W2 of the rotation drive device 27 can be, for example, the maximum width of the inspection opening portion 16 in the horizontal direction.

In a case where the circuit board 3A is disposed in the above-described positional relationship with the rotation drive device 27 serving as the structure 5B, for example, it is desirable that the upper blocking member 61 is provided such that the width W61 thereof is in a state of overlapping with at least the maximum width W2 (see FIG. 3) of the structure 5B and is equal to or larger than the width larger than the maximum width W2, as shown in FIG. 4.

The upper blocking member 61 in Exemplary Embodiment 1 is provided such that the width W61 thereof is in a state of overlapping with the maximum width W2 of the structure 5B and is larger than the maximum width W2 as shown in FIG. 4.

As a result, in the image forming apparatus 10, for example, as compared with a case where the upper blocking member 61 is provided to have the width W61 smaller than the maximum width W2 of the structure 5B, the falling article 9 is easily prevented from entering the gap S1.

Specifically, the article 9 that falls due to the work related to the structure 5B is prevented from entering the gap S1 by accurately blocking the route of the article 9 that advances to enter the gap S1 from the portion above the gap S1 via the upper blocking member 61.

In other words, in a case where the upper blocking member 61 is provided to have the width W61 smaller than the maximum width W2 of the structure 5B, a portion in which the upper blocking member 61 does not exist is generated in the portion above the gap S1, and there is a possibility that the article 9 falling through the portion enters the gap S1.

Figure 7A:
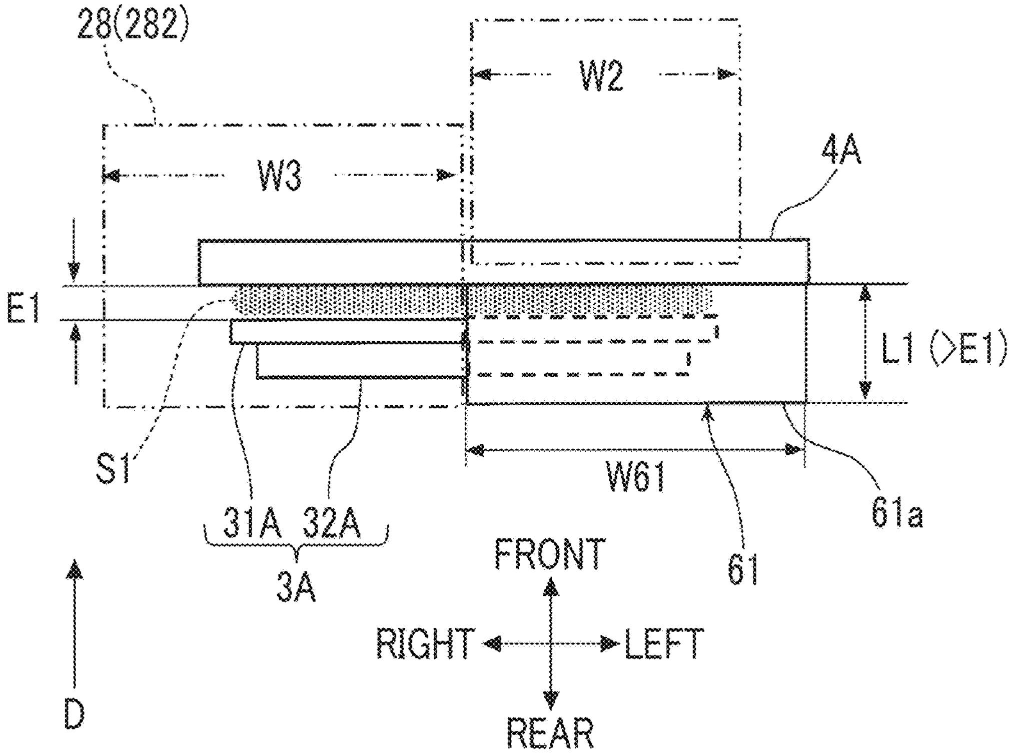
FIG. 7A is a schematic top view of one upper blocking member and components around the upper blocking member as viewed from above.
Figure 7B:
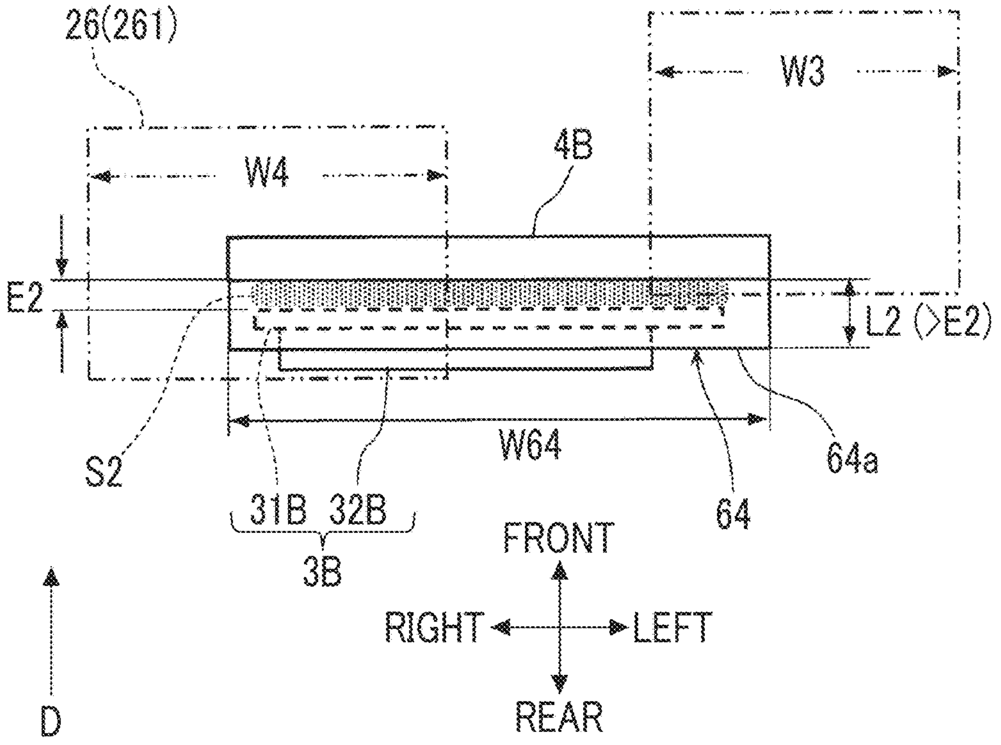
FIG. 7B is a schematic top view of another upper blocking member and components around the upper blocking member as viewed from above.

In addition, as shown in FIGS. 7A and 7B, the upper blocking members 61 and 64 are provided to have the dimensions longer than the intervals in the depth direction D (depth dimensions) E1 and E2 of the gaps S1 and S2, respectively, in the depth direction D toward the attachment plates 4A and 4B from the circuit boards 3A and 3B.

In Exemplary Embodiment 1, a length L1 of the upper blocking member 61 along the depth direction D is a dimension (L1>E1) longer than the interval E1 of the gap S1. In addition, in Exemplary Embodiment 1, a length L2 of the upper blocking member 64 along the depth direction D is a dimension (L2>E2) longer than the interval E2 of the gap S2.

As a result, in the image forming apparatus 10, the article 9 falling from above is easily prevented from entering the gaps S1 and S2, as compared with a case where the upper blocking members 61 and 64 are provided to have the dimensions shorter than the intervals E1 and E2, which are the depth dimensions of the gaps S1 and S2.

In other words, in a case where the upper blocking members 61 and 64 are provided to have the dimensions shorter than the intervals E1 and E2 between the gaps S1 and S2, a portion in which the upper blocking members 61 and 64 do not exist is generated in a part of the portions above the gaps S1 and S2 with respect to the depth direction D. Therefore, in this case, there is a possibility that the falling article 9 passes through the portion above the gaps S1 and S2 in which the upper blocking members 61 and 64 do not exist and enters the gaps S1 and S2. The portion above the gaps S1 and S2 in which the upper blocking members 61 and 64 do not exist is a major target portion in which the gap having a width through which the falling article 9 can pass is formed.

Further, it can also be said that the upper blocking members 61 and 64 are provided in a state where the gaps S1 and S2 are not visible due to the upper blocking members 61 and 64 in a case where the upper blocking members 61 and 64 are viewed from an upper side toward a lower side in the vertical direction as shown in FIGS. 7A and 7B.

Strictly speaking, the upper blocking member 61 is provided in a state where a part of the gap S1 is not visible. However, the remaining portion of the gap S2 is in a state of being not visible due to the fan attachment frame 282 of the blowing device 28.

Reference numeral W61 in FIG. 7A indicates a width along a direction orthogonal to the depth direction D of the upper blocking member 61 and a horizontal direction. In addition, reference numeral W64 in FIG. 7B indicates a width along a direction orthogonal to the depth direction D of the upper blocking member 64 and a horizontal direction.

As a result, in the image forming apparatus 10, the article 9 falling from above is prevented from entering the gaps S1 and S2, as compared with a case where the upper blocking members 61 and 64 are provided in a state where at least a part of the gaps S1 and S2 is visible as viewed from an upper side toward a lower side in the vertical direction.

That is, in a case where the upper blocking members 61 and 64 are provided in a state where at least a part of the gaps S1 and S2 is visible, a portion of the upper blocking members 61 and 64 does not exist is generated in a part of the portion above the gaps S1 and S2. Therefore, in this case, there is a possibility that the falling article 9 passes through the portion above the gaps S1 and S2 in which the upper blocking members 61 and 64 do not exist and enters the gaps S1 and S2. In this case, even in the portion above the gaps S1 and S2 in which the upper blocking members 61 and 64 do not exist, a portion in which a gap having a width similar to that in the case of the above-described portion is formed is a major target.

In addition, as shown in FIG. 8B and the like, the upper blocking member 64 has an end portion 64*c* through which the wiring cable 56 approaches or comes into contact and passes.

In this case, for example, it is desirable that the upper blocking member 64 has a bent shape at the end portion 64*c*.

The bent shape is a shape in which a portion in contact with the wiring cable 56 is not a sharp corner portion but a rounded curved surface. This bent shape is obtained by bending processing and the like. The bent shape is usually bent on the lower side, but may be bent on the upper side.

The end portion 64*c* of the upper blocking member 64 may have a rounded end surface shape instead of the bent shape.

In a case where the end portion 64*c* in the upper blocking member 64 is formed in a bent shape as described above, the wiring cable 56 softly comes into contact with the end portion 64*c* in the bent shape of the upper blocking member 64 as compared with a case where the end portion 64*c* is not formed in the bent shape. Therefore, in this case, a possibility that the wiring cable 56 is damaged or cut by coming into contact with the end portion 64*c* of the upper blocking member 64 is reduced.

In addition, in the image forming apparatus 10, which is an example of the circuit board-equipped apparatus 1, for example, the circuit board 3A is a circuit board that requires cooling.

Figure 9:
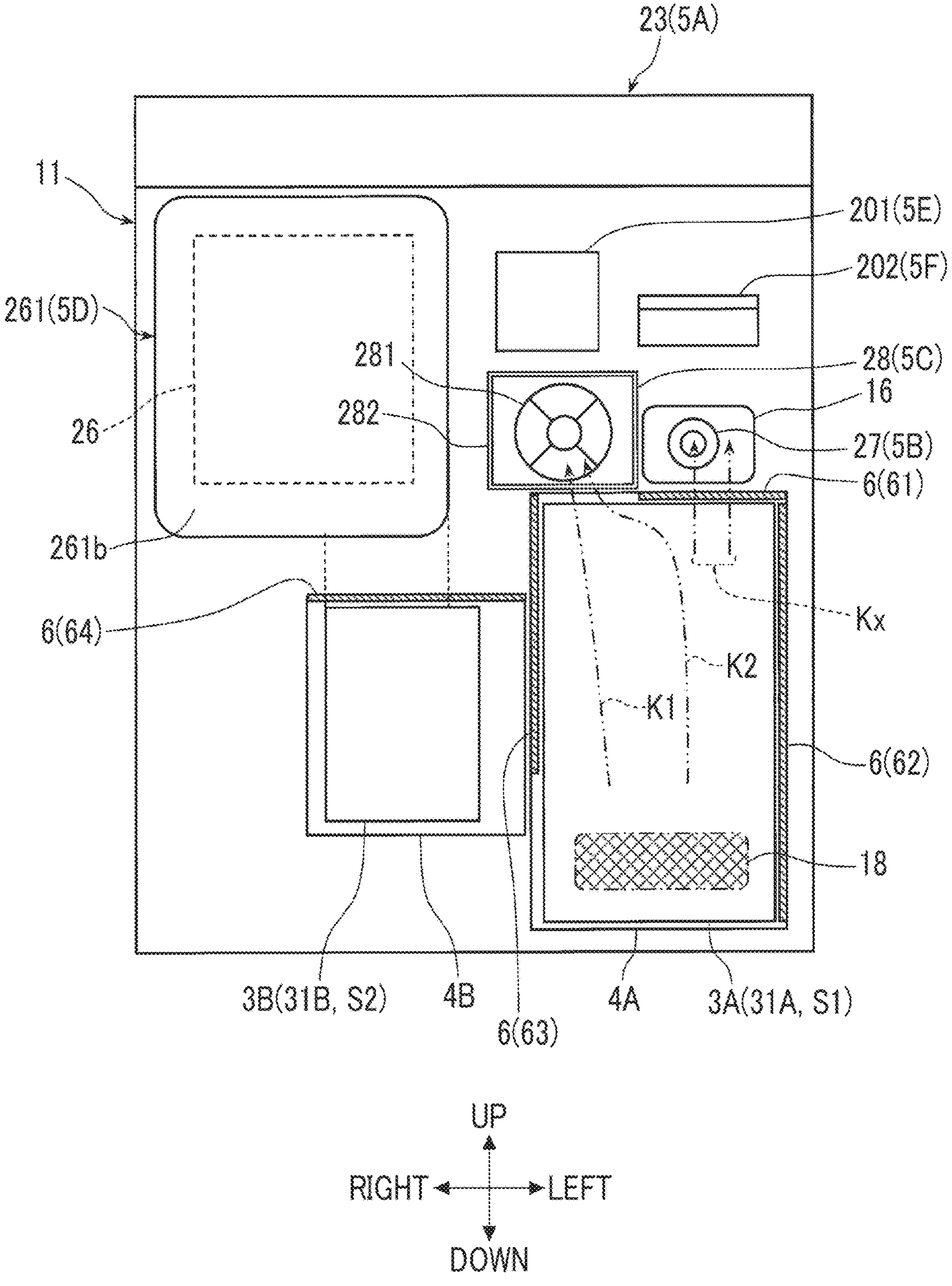
FIG. 9 is a schematic view showing a configuration of one circuit board, a blower fan, and the upper blocking member.

In addition, as shown in FIG. 9 and the like, the blower fan 281 of the blowing device 28 is disposed to exist in a state of overlapping an upper side of a part of the upper end of the circuit board 3A.

In this case, for example, it is desirable that the blocking member 6 is provided to exist at least in a portion of the upper end of the substrate 31A of the circuit board 3A that requires the cooling, the portion excluding a part in which the blower fan 281 is disposed to overlap.

The upper blocking member 61 in Exemplary Embodiment 1 is provided as shown in FIG. 9 and the like to exist in a portion of the upper end of the substrate 31A of the circuit board 3A, the portion excluding a part in which the blower fan 281 is disposed to overlap.

In addition, a ventilation opening portion (not shown) that is connected to at least the mounting surface 31*e* (see FIG. 2) side of the substrate 31A of the circuit board 3A is formed in a portion that is disposed to overlap with the upper end of the substrate 31A of the circuit board 3A in the fan attachment frame 282 of the blowing device 28.

As a result, in the image forming apparatus 10, airflows K1 and K2, and the like that flow to pass through the circuit board 3A are generated by suction power due to the driving of the blower fan 281. As a result, in the image forming apparatus 10, the circuit board 3A that requires the cooling is cooled by the airflow generated by the blower fan 281.

In other words, in a case where the blocking member 6 is not provided in the upper end of the circuit board 3A that requires the cooling, the upper portion excluding the part in which the blower fan 281 is disposed to overlap, the following problems may occur.

That is, in this case, as shown in FIG. 9 by an arrow Kx indicated by a two-point chain line, a part (Kx) of the airflow generated by the driving of the blower fan 281 does not flow toward the blower fan 281, and flows to leak from a part of the upper end of the circuit board 3A. Therefore, in this case, the circuit board 3A cannot be efficiently cooled by the airflow generated by the blower fan 281.

Incidentally, in the image forming apparatus 10, the left side blocking member 62 and the right side blocking member 63 are provided in addition to the upper blocking member 61 in the circuit board 3A that requires the cooling.

Therefore, the airflow generated by the blower fan 281 easily flows through a space between the left side blocking member 62 and the right side blocking member 63 as a ventilation path. As a result, in the image forming apparatus 10, the circuit board 3A that requires the cooling may be cooled more efficiently by the airflow generated by the blower fan 281, as compared with a case where the left side blocking member 62 and the right side blocking member 63 are not provided.

In addition, the image forming apparatus 10, which is an example of the circuit board-equipped apparatus 1 includes, as shown in FIG. 1B, the rear surface cover 12*r* (see FIG. 1B) which is an example of the facing plate disposed in a state of facing the circuit board 3A that requires the cooling.

In this case, for example, it is desirable that a ventilation hole through which external air (outside air) can be taken in is provided in at least a part of a region of the rear surface cover 12*r* facing the circuit board 3A.

In Exemplary Embodiment 1, as shown in FIG. 9, a ventilation hole 18 is provided in the lower region of the rear surface cover 12*r* in the up-down direction.

The ventilation hole 18 may be a through-hole such as a punched hole, a slit-shaped opening portion, or a net-like porous material.

As a result, in the image forming apparatus 10 provided with the ventilation hole 18, as compared with a case where the ventilation hole 18 is not provided in at least a part of a region of the rear surface cover 12*r*, which is an example of the facing plate, facing the circuit board 3A that requires the cooling, the outside air, which is the air outside the housing 11, is easily taken in from the ventilation hole 18 toward the circuit board 3A by the suction power generated by the driving of the blower fan 281.

As a result, in the image forming apparatus 10, the circuit board 3A that requires the cooling can be cooled with outside air.

Exemplary Embodiment 2

Figure 10:
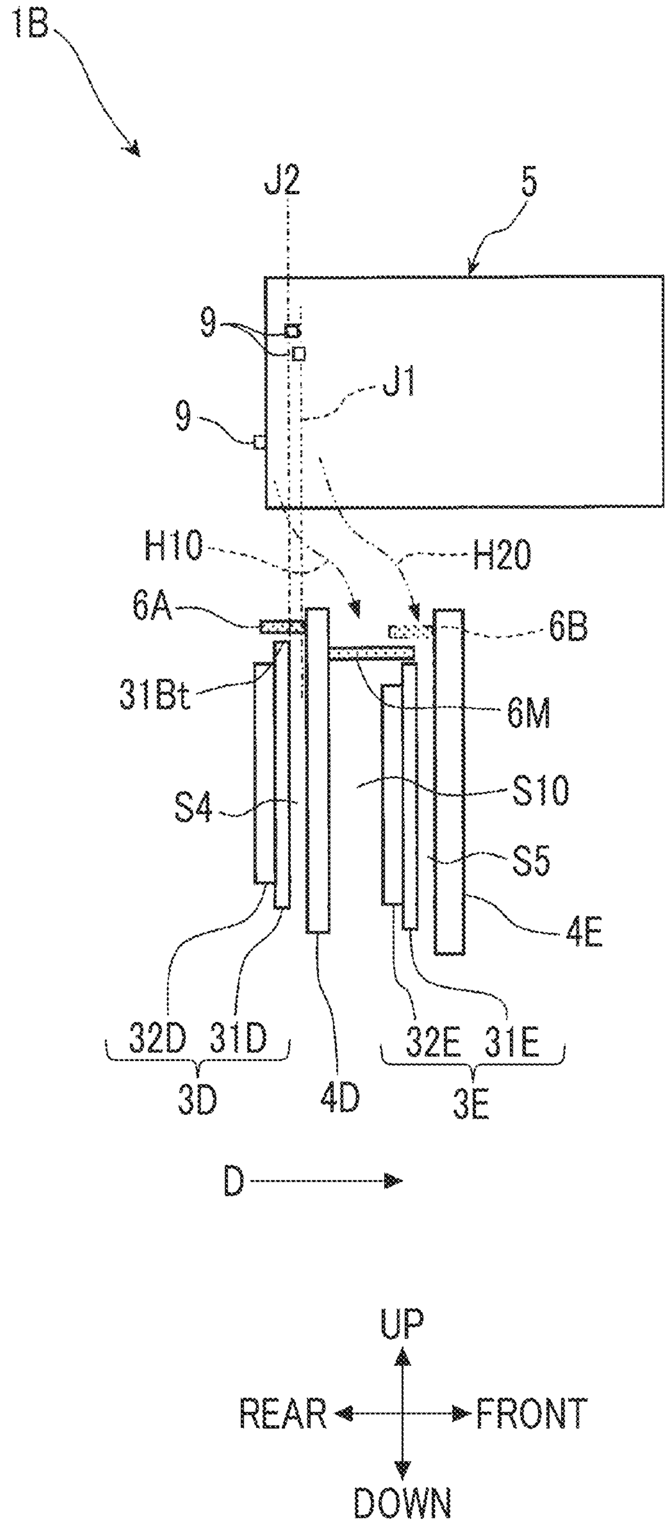
FIG. 10 is a schematic view of a circuit board-equipped apparatus according to Exemplary Embodiment 2 as viewed from a right side.

FIG. 10 shows a major part of a circuit board-equipped apparatus 1B according to Exemplary Embodiment 2 of the present invention.

The circuit board-equipped apparatus 1B includes a front-side circuit board 3D disposed on a front side of the circuit board 3 and first exposed to the outside, and a back-side circuit board 3E disposed backward of the front-side circuit board 3D and less visible from the outside than the front-side circuit board 3D.

The front-side circuit board 3D is composed of a substrate 31D and a circuit component 32D, as in a case of the circuit board 3A in Exemplary Embodiment 1. In addition, the back-side circuit board 3E is also composed of a substrate 31E and a circuit component 32E in the identical manner.

In addition, the circuit board-equipped apparatus 1B includes, as the attachment plate 4, a front-side attachment plate 4D to which the front-side circuit board 3D is attached and a back-side attachment plate 4E to which the back-side circuit board 3E is attached.

Further, in the circuit board-equipped apparatus 1B, the structure 5 that requires the work is disposed above the front-side circuit board 3D and the back-side circuit board 3E.

In the circuit board-equipped apparatus 1B, as shown in FIG. 10, a front-side upper blocking member 6A is provided.

The front-side upper blocking member 6A is a member that blocks at least a part of a route along which the article 9 falling from above moves toward the upper end of the gap S4 between the front-side circuit board 3D and the front-side attachment plate 4D.

In addition, the front-side upper blocking member 6A is provided at the upper end of the front-side attachment plate 4D, which is directed toward the gap S4 between the front-side circuit board 3D and the back-side circuit board 3E.

Further, the front-side upper blocking member 6A is provided in a state of rising from the front-side attachment plate 4D and passing over to approach or come into contact with the upper end of the substrate 31D of the front-side circuit board 3D.

In the circuit board-equipped apparatus 1B, as shown in FIG. 10, an intermediate blocking member 6M is additionally provided.

As shown in FIG. 10, the intermediate blocking member 6M is a member that blocks at least a part of a first route H10 on the back side along which the article 9 falling from above moves toward an upper end of a gap S10 between the front-side attachment plate 4D and the back-side circuit board 3E.

In addition, the intermediate blocking member 6M is provided on a surface of the front-side attachment plate 4D opposite to the surface on which the front-side upper blocking member 6A is provided.

Further, the intermediate blocking member 6M is provided in a state of rising from the front-side attachment plate 4D and reaching to approach or come into contact with the upper end of the substrate 31E of the back-side circuit board 3E.

As a result, in the circuit board-equipped apparatus 1B, as compared with a case where the intermediate blocking member 6M is not additionally provided as the blocking member 6, the article 9 falling due to the work on the structure 5 is also prevented from entering the gap S10.

Incidentally, the falling article 9 is prevented from entering the gap S4 by the front-side upper blocking member 6A. In addition, both the front-side upper blocking member 6A and the intermediate blocking member 6M are disposed in at least a part of a range from the structure 5 to the front-side circuit board 3D and the back-side circuit board 3E.

In Exemplary Embodiment 2, for example, it is desirable that the back-side upper blocking member 6B is additionally provided as the blocking member 6 as indicated by a two-point chain line in FIG. 10.

The back-side upper blocking member 6B is a member that blocks at least a part of a second route H20 along which the article 9 falling from above moves toward a gap S5 between the back-side circuit board 3E and the back-side attachment plate 4E, as shown in FIG. 10.

In addition, the back-side upper blocking member 6B is provided at the upper end of the back-side attachment plate 4E. Further, the back-side upper blocking member 6B is provided in a state of rising from the back-side attachment plate 4E and partially overlapping to approach or come into contact with the upper surface of the intermediate upper blocking member 6M.

The back-side upper blocking member 6B is disposed in at least a part of a range from the structure 5 to the front-side circuit board 3D and the back-side circuit board 3E.

As a result, in the circuit board-equipped apparatus 1B provided with the back-side upper blocking member 6B, the article 9 falling due to the work on the structure 5 may be prevented from entering the gap S5, as compared with a case where the back-side upper blocking member 6B is not additionally provided as the blocking member 6.

Modification Example

The present invention is not limited to the configuration example shown in Exemplary Embodiments 1 and 2, and includes modifications, combinations, and the like as necessary without departing from the gist of each invention described in the claims. Therefore, the present invention also includes, for example, the following modification examples.

The blocking member 6 is not limited to have a planar shape as a rectangular shape as in the upper blocking members 61 and 64. That is, the blocking member 6 may have various planar shapes as long as the blocking member 6 can block the route H along which the falling article 9 moves toward each gap S.

In addition, the blocking member 6 may have, for example, a form in which an opening portion exists in a part thereof or a form made of a porous member, as long as the blocking member 6 can block the route H along which the falling article 9 moves toward each gap S.

Figure 11:
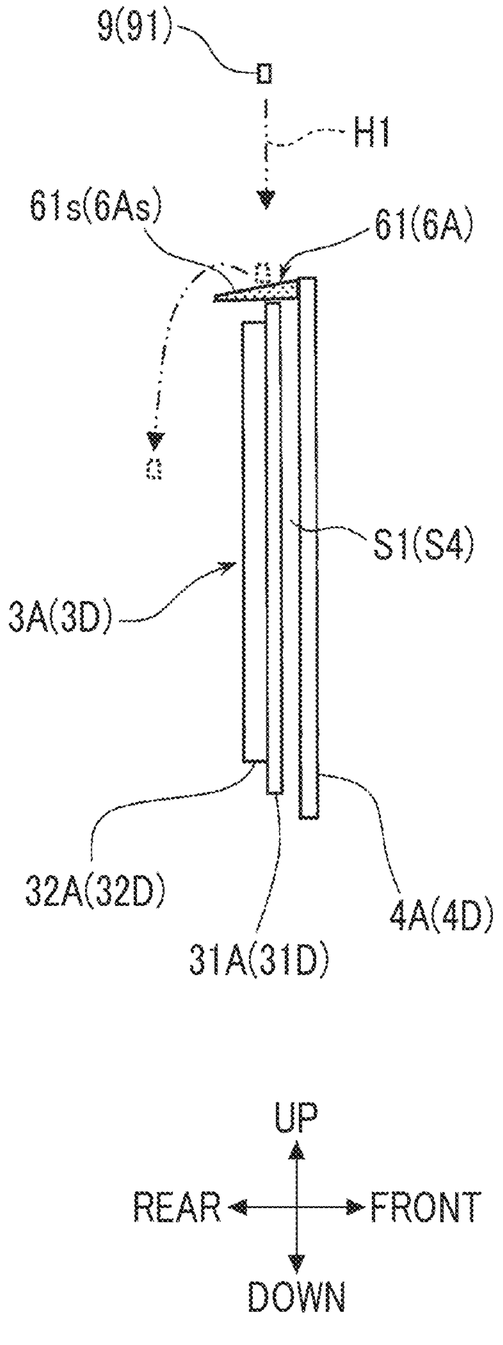
FIG. 11 is a schematic side view showing a modification example of the upper blocking member.

In addition, as shown in FIG. 11, the upper blocking members 61 and 6A may be configured to have the upper surface portion 61*s* (6As) consisting of a downward inclined surface that is inclined downward as the downward inclined surface passes through the attachment plates 4A and 4D and away from the circuit boards 3A and 3D.

The upper surface portion 61*s* (6As) is not limited to a case where only the upper surface is formed as the downward inclined surface. For example, the upper surface portion 61*s* (6As) may be configured such that the entire upper blocking members 61 and 6A are provided in a state of being inclined downward, and the upper surface in this case is the downward inclined surface.

In a case of the upper blocking members 61 and 6A having the upper surface portions 61*s* (6As), as shown in FIG. 11, in a case where the article 9 that has fallen due to the work on the structure 5 reaches the upper blocking members 61 and 6A, the article 9 falls due to the inclination of the upper surface portions 61*s* (6As) consisting of the downward inclined surface.

Figure 12:
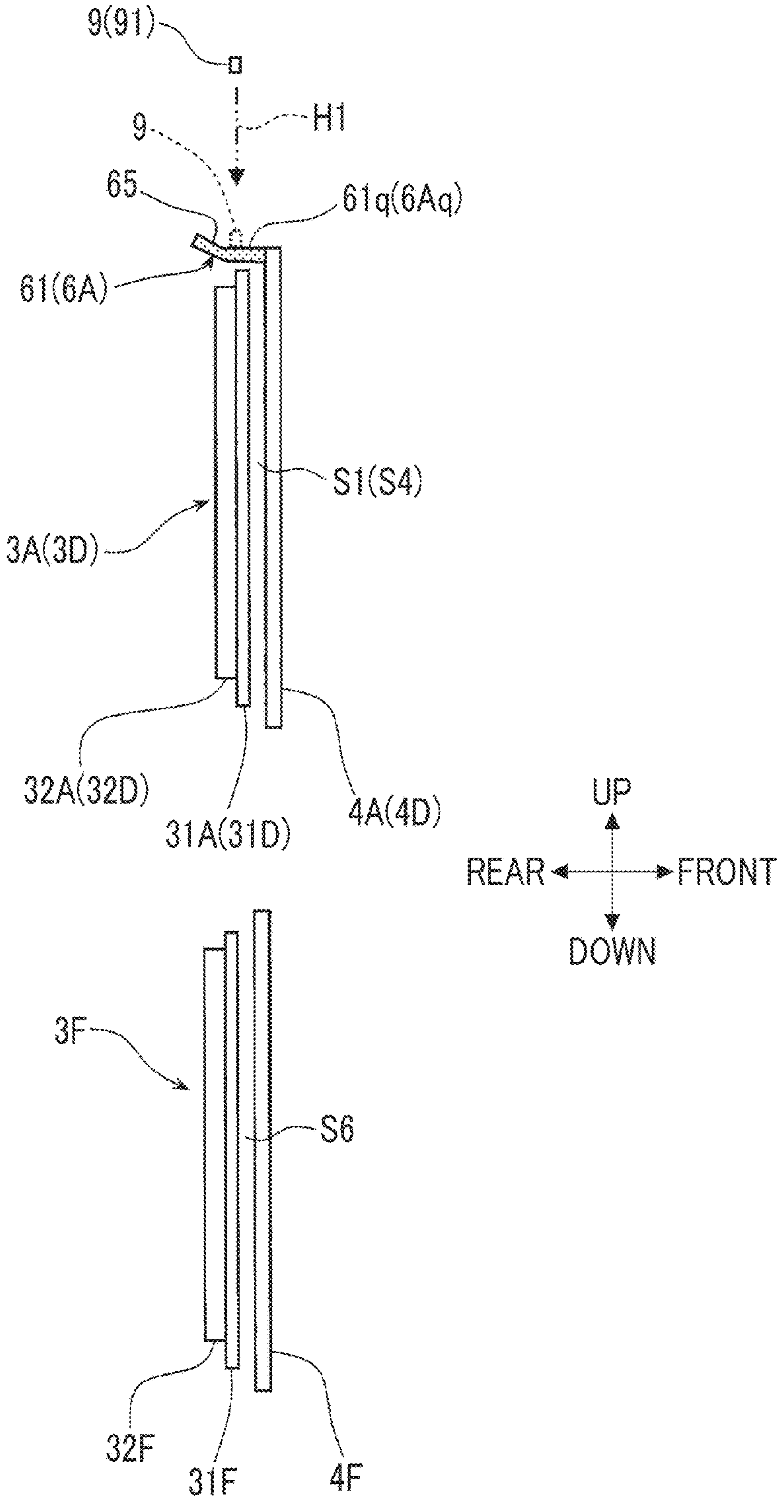
FIG. 12 is a schematic side view showing another modification example of the upper blocking member.

Further, as shown in FIG. 12, the upper blocking members 61 and 6A may be have an upper surface portion 61*q* (6Aq) having an upward inclined surface portion 65 that is inclined upward at an end portion away from the attachment plates 4A and 4D.

Reference numeral 3F in FIG. 12 indicates a lower circuit board disposed at a position below the circuit board 3A or the circuit board 3D. A circuit component 32F is mounted on the substrate 31F of the lower circuit board 3F. In addition, the lower circuit board 3F is attached to the attachment plate 4F in a state where a gap S6 is formed therebetween.

Figure 13A:
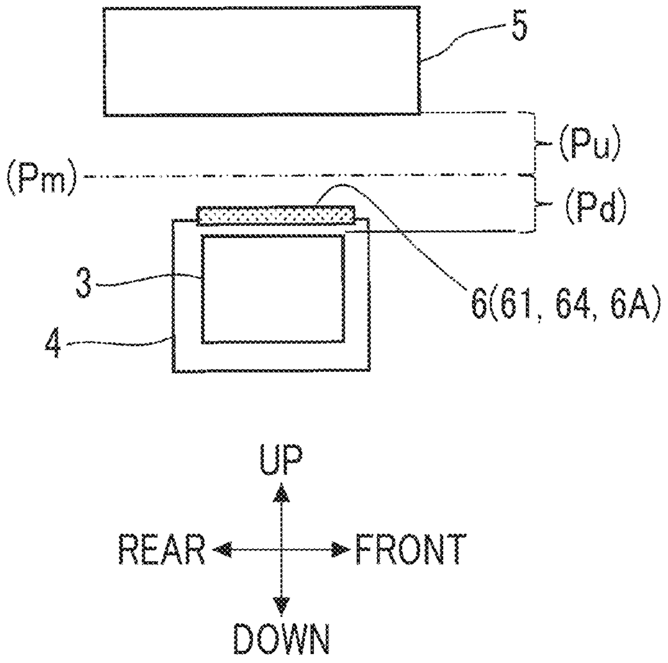
FIG. 13A is a schematic view showing a disposition example of the upper blocking member.

In Exemplary Embodiments 1 and 2, the upper blocking members 61, 64, and 6A of the blocking member 6 may be provided to exist in the lower half range Pd that does not include the intermediate position Pm between the structure 5 and the circuit board 3 as shown in FIG. 13A.

Figure 13B:
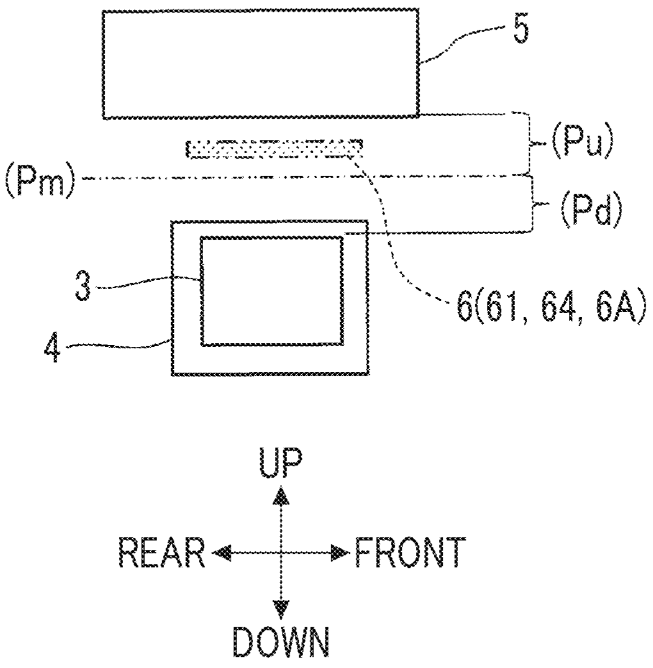
FIG. 13B is a schematic view showing another disposition example of the upper blocking member.

The upper blocking members 61, 64, and 6A of the blocking member 6 may be provided to exist in the upper half range Pu including the intermediate position Pm between the structure 5 and the circuit board 3 as shown in FIG. 13B.

In addition, in Exemplary Embodiment 1 and the like, the image forming apparatus 10 has been described as the circuit board-equipped apparatus 1, but the circuit board-equipped apparatus 1 according to the exemplary embodiment of the present invention is not limited to the image forming apparatus 10. That is, the circuit board-equipped apparatus 1 according to the exemplary embodiment of the present invention need only be an apparatus that is equipped with at least the circuit board 3, the attachment plate 4, and the structure 5 as described above.

As another example of the circuit board-equipped apparatus 1, for example, home appliances are used.

In addition, the number, the type, the positional relationship, the shape, and the like of the circuit board 3, the attachment plate 4, the structure 5, and the blocking member 6 are not limited to the configurations described in Exemplary Embodiments 1 and 2.

In addition, the configuration in which the blocking member 6 is provided on the attachment plate 4 of the circuit board 3 in Exemplary Embodiment 1 and the like has been described, but for example, the blocking member 6 may be provided on other members, such as the structural frame for attaching the circuit board 3.

Further, the configuration in which the upper blocking members 61 and 64 of the blocking member 6 are configured to be provided with the flat plate-shaped members described in Exemplary Embodiment 1 and the like in a substantially horizontal state has been described, but the present invention is not limited thereto.

The upper blocking member 61 and the like may be provided, for example, in a state where the entire upper surface is an inclined surface inclined to one side to be moved to guide the falling article 9. The upper blocking member 61 and the like may be an upper blocking member in which a part of the upper surface is formed as an inclined surface inclined downward, or an upper blocking member having a shape that is bent in a mountain shape.

Supplementary Note (((1)))

A circuit board-equipped apparatus comprising:

a circuit board;

an attachment plate to which the circuit board is attached;

a structure that is disposed above the circuit board and that requires work; and a blocking member that is provided in at least a part of a range from the structure to the circuit board and that blocks at least a part of a route along which an article falling from above due to the work moves toward a gap between the circuit board and the attachment plate.

(((2)))

The circuit board-equipped apparatus according to (((1))), wherein the circuit board is disposed in a positional relationship in which a surface of the circuit board intersecting a depth direction from the circuit board toward the attachment plate exists inside a maximum width in a horizontal direction of a portion of the structure intersecting the depth direction, and the blocking member is provided to have a width equal to or larger than a width corresponding to a maximum width in a horizontal direction of the surface of the circuit board intersecting the depth direction.

(((3))

The circuit board-equipped apparatus according to (((1))), wherein the circuit board is disposed in a positional relationship in which a part of a surface of the circuit board intersecting a depth direction from the circuit board toward the attachment plate exists inside a maximum width in a horizontal direction of a portion of the structure intersecting the depth direction, and the blocking member is provided to have a width equal to or larger than a width corresponding to the part of the surface of the circuit board.

(((4)))

The circuit board-equipped apparatus according to (((1))), wherein the circuit board is disposed in a positional relationship in which a surface of the circuit board intersecting a depth direction from the circuit board toward the attachment plate overlaps with a maximum width in a horizontal direction of a portion of the structure intersecting the depth direction, and exists with a width larger than the maximum width, and the blocking member is provided to have a width equal to or larger than the maximum width of the structure.

(((5)))

The circuit board-equipped apparatus according to any one of (((1))) to (((4))), wherein the blocking member is provided in a lower half range that does not include an intermediate position between the structure and the circuit board.

(((6)))

The circuit board-equipped apparatus according to any one of ((((1))) to (((5))), wherein the blocking member is provided to have a dimension longer than a depth dimension of the gap in a depth direction horizontally toward the attachment plate from the circuit board.

(((7)))

The circuit board-equipped apparatus according to any one of (((1))) to (((6))), wherein the blocking member is provided in a state where the gap is not visible due to the blocking member as viewed from an upper side toward a lower side in a vertical direction.

(((8)))

The circuit board-equipped apparatus according to any one of (((1))) to (((7))), wherein the blocking member has an upper surface portion consisting of a downward inclined surface that is inclined downward as the downward inclined surface passes through the attachment plate and away from the circuit board.

(((9)))

The circuit board-equipped apparatus according to any one of (((1))) to (((8))), wherein the blocking member has an upper surface portion having an upward inclined surface portion that is inclined upward at an end portion away from the attachment plate.

(((10)))

The circuit board-equipped apparatus according to any one of (((1))) to (((9))), wherein the blocking member has an end portion through which a wiring cable approaches or comes into contact and passes, and the end portion has a bent shape.

(((11)))

The circuit board-equipped apparatus according to any one of (((1))) to (((10))), wherein a front-side circuit board disposed on a front side that is first exposed to an outside, and a back-side circuit board disposed backward of the front-side circuit board and less visible from the outside are provided as the circuit board, a front-side attachment plate to which the front-side circuit board is attached, and a back-side attachment plate to which the back-side circuit board is attached are provided as the attachment plate, and an intermediate blocking member that blocks at least a part of a first route on a back side along which the article falling from above moves toward a gap between the front-side attachment plate and the back-side circuit board is additionally provided as the blocking member in at least a part of a range from the structure to the front-side circuit board and the back-side circuit board.

(((12)))

The circuit board-equipped apparatus according to (((11))), wherein a back-side blocking member that blocks at least a part of a second route on a back side along which the article falling from above moves toward a gap between the back-side circuit board and the back-side attachment plate is additionally provided as the blocking member in at least a part of the range from the structure to the front-side circuit board and the back-side circuit board.

(((13)))

The circuit board-equipped apparatus according to any one of (((1))) to (((12))), wherein a circuit board that requires cooling is provided as the circuit board, the circuit board-equipped apparatus further comprises a blower fan disposed in a state of overlapping with an upper side of a part of an upper end of the circuit board that requires the cooling, and the blocking member is provided to exist at least in a portion excluding the part of the upper end of the circuit board that requires the cooling.

(((14)))

The circuit board-equipped apparatus according to (((13))), further comprising:

a facing plate disposed in a state of facing the circuit board that requires the cooling, wherein a ventilation hole is provided in at least a part of a region of the facing plate facing the circuit board that requires the cooling.

(((15)))

The circuit board-equipped apparatus according to any one of (((1))) to (((14))), wherein the structure is disposed such that a first imaginary plane that imaginarily extends downward in a vertical direction from a portion that requires the work is disposed in a state of overlapping with at least a part of the gap, or is disposed to exist rearward of the gap.

(((16)))

The circuit board-equipped apparatus according to any one of (((1))) to (((15))), wherein the structure is disposed rearward of the circuit board.

(((17)))

The circuit board-equipped apparatus according to (((16))), wherein the structure is disposed rearward of a second imaginary plane that imaginarily extends upward in a vertical direction from an upper end of the circuit board.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A circuit board-equipped apparatus comprising:

a circuit board;

an attachment plate to which the circuit board is attached, wherein the attachment plate is a plate-shaped member extending in a vertical up-down direction of the circuit board-equipped apparatus;

a structure that is disposed above the circuit board and that requires work; and a blocking member that is disposed on and attached to a peripheral edge portion of the attachment plate provided in at least a part of a range from the structure to the circuit board and that blocks at least a part of a route along which an article falling from above due to the work moves toward a gap between the circuit board and the attachment plate, wherein the gap extends in the vertical up-down direction of the circuit board-equipped apparatus, and the blocking member covers on the circuit board and the gap over a horizontal front-rear direction of the circuit board-equipped apparatus.

2. The circuit board-equipped apparatus according to claim 1, wherein the circuit board is disposed in a positional relationship in which a surface of the circuit board intersecting a depth direction from the circuit board toward the attachment plate exists inside a maximum width in a horizontal direction of a portion of the structure intersecting the depth direction, and the blocking member is provided to have a width equal to or larger than a width corresponding to a maximum width in a horizontal direction of the surface of the circuit board intersecting the depth direction.

3. The circuit board-equipped apparatus according to claim 2, wherein the structure is disposed such that a first imaginary plane that imaginarily extends downward in a vertical direction from a portion that requires the work is disposed in a state of overlapping with at least a part of the gap, or is disposed to exist rearward of the gap.

4. The circuit board-equipped apparatus according to claim 1, wherein the circuit board is disposed in a positional relationship in which a part of a surface of the circuit board intersecting a depth direction from the circuit board toward the attachment plate exists inside a maximum width in a horizontal direction of a portion of the structure intersecting the depth direction, and the blocking member is provided to have a width equal to or larger than a width corresponding to the part of the surface of the circuit board.

5. The circuit board-equipped apparatus according to claim 4, wherein the structure is disposed such that a first imaginary plane that imaginarily extends downward in a vertical direction from a portion that requires the work is disposed in a state of overlapping with at least a part of the gap, or is disposed to exist rearward of the gap.

6. The circuit board-equipped apparatus according to claim 1, wherein the circuit board is disposed in a positional relationship in which a surface of the circuit board intersecting a depth direction from the circuit board toward the attachment plate overlaps with a maximum width in a horizontal direction of a portion of the structure intersecting the depth direction, and exists with a width larger than the maximum width, and the blocking member is provided to have a width equal to or larger than the maximum width of the structure.

7. The circuit board-equipped apparatus according to claim 6, wherein the structure is disposed such that a first imaginary plane that imaginarily extends downward in a vertical direction from a portion that requires the work is disposed in a state of overlapping with at least a part of the gap, or is disposed to exist rearward of the gap.

8. The circuit board-equipped apparatus according to claim 1, wherein the blocking member is provided in a lower half range that does not include an intermediate position between the structure and the circuit board.

9. The circuit board-equipped apparatus according to claim 1, wherein the blocking member is provided to have a dimension longer than a depth dimension of the gap in a depth direction horizontally toward the attachment plate from the circuit board.

10. The circuit board-equipped apparatus according to claim 1, wherein the blocking member is provided in a state where the gap is not visible due to the blocking member as viewed from an upper side toward a lower side in a vertical direction.

11. The circuit board-equipped apparatus according to claim 1, wherein the blocking member has an upper surface portion consisting of a downward inclined surface that is inclined downward as the downward inclined surface passes through the attachment plate and away from the circuit board.

12. The circuit board-equipped apparatus according to claim 1, wherein the blocking member has an upper surface portion having an upward inclined surface portion that is inclined upward at an end portion away from the attachment plate.

13. The circuit board-equipped apparatus according to claim 1, wherein the blocking member has an end portion through which a wiring cable approaches or comes into contact and passes, and the end portion has a bent shape.

14. The circuit board-equipped apparatus according to claim 1, wherein a front-side circuit board disposed on a front side that is first exposed to an outside, and a back-side circuit board disposed backward of the front-side circuit board and less visible from the outside are provided as the circuit board, a front-side attachment plate to which the front-side circuit board is attached, and a back-side attachment plate to which the back-side circuit board is attached are provided as the attachment plate, and an intermediate blocking member that blocks at least a part of a first route on a back side along which the article falling from above moves toward a gap between the front-side attachment plate and the back-side circuit board is additionally provided as the blocking member in at least a part of a range from the structure to the front-side circuit board and the back-side circuit board.

15. The circuit board-equipped apparatus according to claim 14, wherein a back-side blocking member that blocks at least a part of a second route on a back side along which the article falling from above moves toward a gap between the back-side circuit board and the back-side attachment plate is additionally provided as the blocking member in at least a part of the range from the structure to the front-side circuit board and the back-side circuit board.

16. The circuit board-equipped apparatus according to claim 1, wherein a circuit board that requires cooling is provided as the circuit board, the circuit board-equipped apparatus further comprises a blower fan disposed in a state of overlapping with an upper side of a part of an upper end of the circuit board that requires the cooling, and the blocking member is provided to exist at least in a portion excluding the part of the upper end of the circuit board that requires the cooling.

17. The circuit board-equipped apparatus according to claim 16, further comprising:

a facing plate disposed in a state of facing the circuit board that requires the cooling, wherein a ventilation hole is provided in at least a part of a region of the facing plate facing the circuit board that requires the cooling.

18. The circuit board-equipped apparatus according to claim 1, wherein the structure is disposed such that a first imaginary plane that imaginarily extends downward in a vertical direction from a portion that requires the work is disposed in a state of overlapping with at least a part of the gap, or is disposed to exist rearward of the gap.

19. The circuit board-equipped apparatus according to claim 1, wherein the structure is disposed rearward of the circuit board.

20. The circuit board-equipped apparatus according to claim 19, wherein the structure is disposed rearward of a second imaginary plane that imaginarily extends upward in a vertical direction from an upper end of the circuit board.

* * * * *